United States Patent
Kato et al.

(10) Patent No.: US 7,528,856 B2
(45) Date of Patent: May 5, 2009

(54) IMAGE FORMING APPARATUS, OPTICAL SCANNING DEVICE AND MANUFACTURING METHOD OF OPTICAL SCANNING DEVICE

(75) Inventors: Ryota Kato, Nagoya (JP); Taizo Matsuura, Ama-gun (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 57 days.

(21) Appl. No.: 11/189,160

(22) Filed: Jul. 25, 2005

(65) Prior Publication Data
US 2006/0016971 A1 Jan. 26, 2006

(30) Foreign Application Priority Data
Jul. 23, 2004 (JP) ............................. 2004-215940
Aug. 6, 2004 (JP) ............................. 2004-230647

(51) Int. Cl.
*B41J 15/14* (2006.01)
*B41J 27/00* (2006.01)

(52) U.S. Cl. ...................................... 347/242; 347/257

(58) Field of Classification Search ............... 347/235, 347/241–244, 250, 256–258
See application file for complete search history.

(56) References Cited

U.S. PATENT DOCUMENTS 5,606,449 A * 2/1997 Nishiyama ................... 359/210
6,163,333 A * 12/2000 Kamioka ..................... 347/241
6,825,961 B2 * 11/2004 Yoshida ....................... 359/204
2003/0025783 A1 * 2/2003 Mori .......................... 347/234
2004/0100673 A1 * 5/2004 Sakai et al. .................. 359/216

FOREIGN PATENT DOCUMENTS

JP 2000-255096 A 9/2000
JP 2001-108922 A 4/2001

OTHER PUBLICATIONS

Patent Abstracts of Japan for JP2001-108922 published Apr. 20, 2001.
Patent Abstracts of Japan for JP2000-255096 published Sep. 19, 2000.

* cited by examiner

*Primary Examiner*—Hai C Pham
(74) *Attorney, Agent, or Firm*—Darby & Darby P.C.

(57) ABSTRACT

An optical scanning device that emits a light beam and scans a scanning subject with the light beam, includes: a holder mounted with a light source that emits the light beam, a collimator lens that converts the emitted light beam to approximately collimated beam, and a slit that interrupts apart of the collimated beam; a deflector having a reflecting surface, the deflector deflecting the light beam emitted from the light source; a cylindrical lens that focuses the light beam that has passed through the slit onto the reflecting surface of the deflector; and a frame having a base stage that is mounted with the deflector and the cylindrical lens. The holder is fixed to the frame by bonding with an adhesive in such a manner that a bottom end portion of the holder is spaced from a top surface of the base stage.

18 Claims, 15 Drawing Sheets

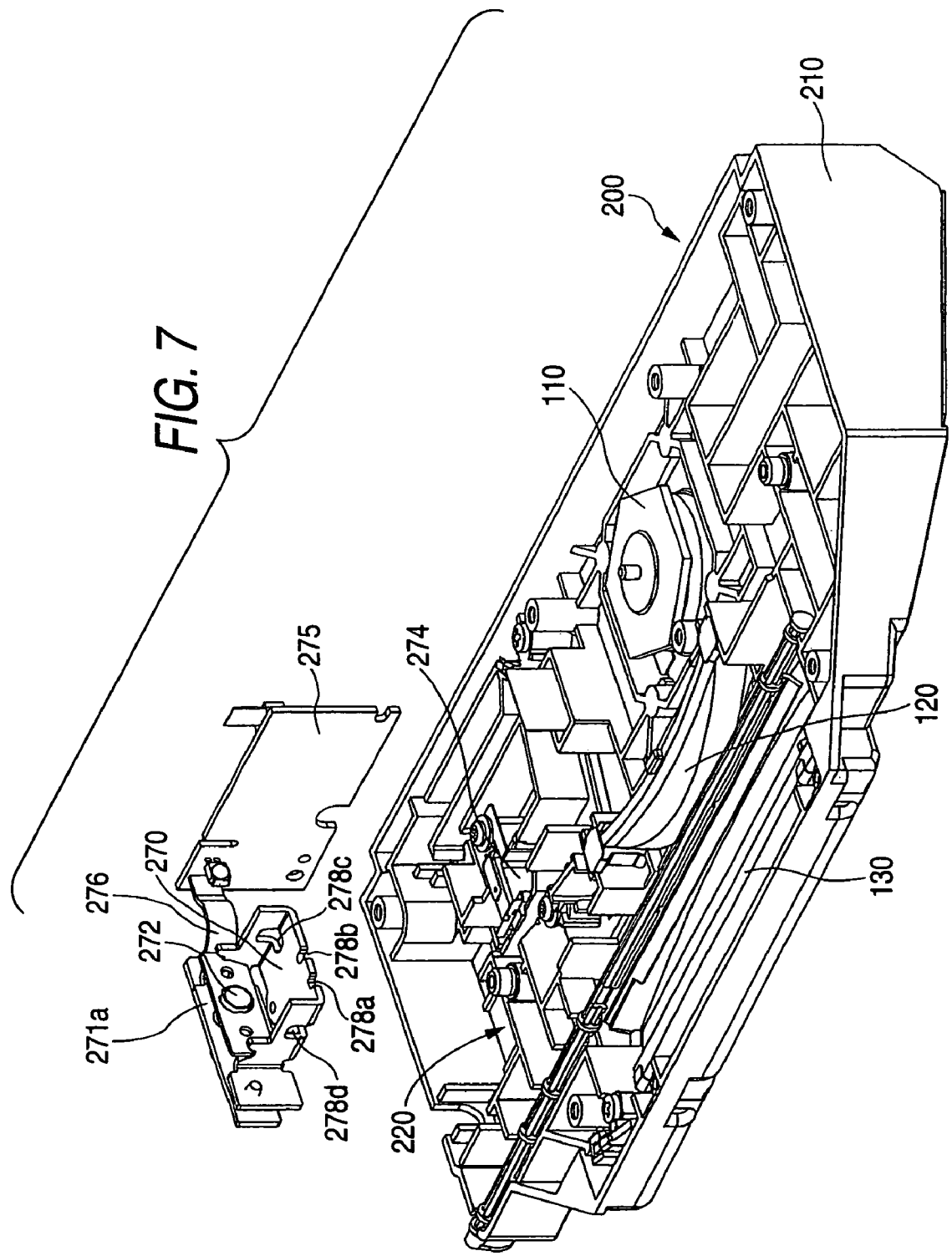

FIG. 13
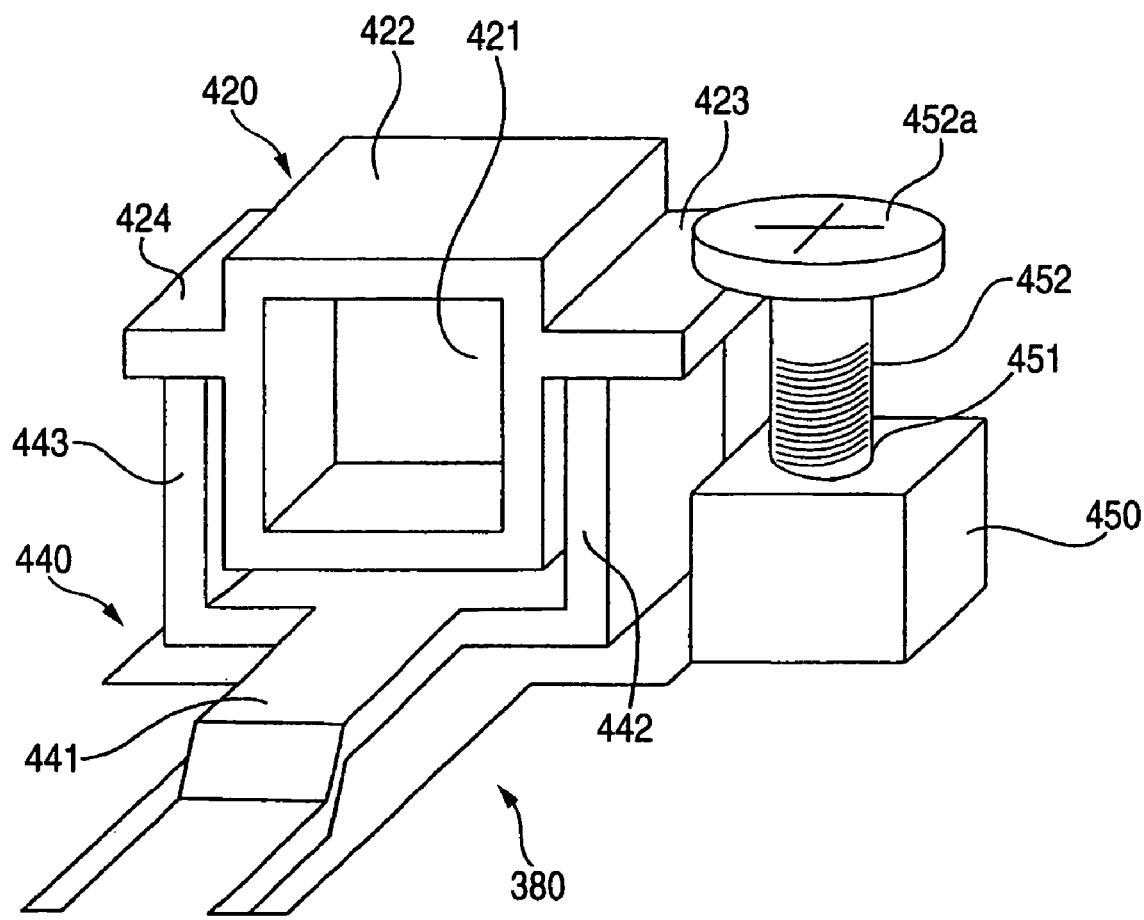
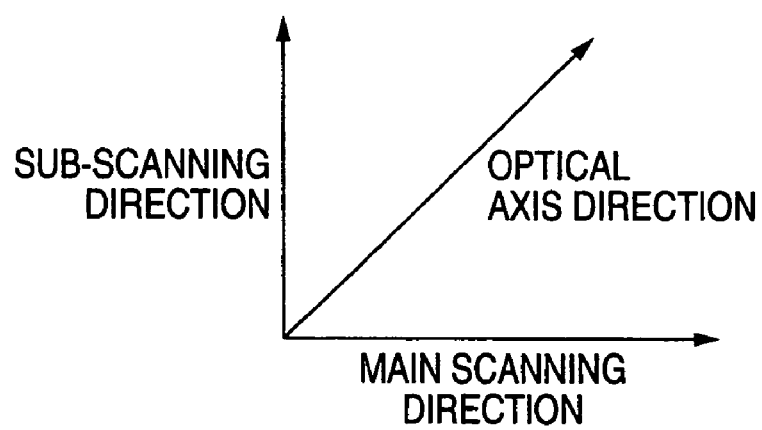

IMAGE FORMING APPARATUS, OPTICAL SCANNING DEVICE AND MANUFACTURING METHOD OF OPTICAL SCANNING DEVICE

INCORPORATION BY REFERENCE

The present application claims priority under 35 U.S.C. §119 to Japanese Patent Application Nos. 2004-215940 filed on Jul. 23, 2004 and 2004-230647 filed on Aug. 6, 2004. The contents of the applications are incorporated herein by reference in their entireties.

BACKGROUND OF THE INVENTION

1. Field of the Invention

The present invention relates to an image forming apparatus and an optical scanning device. In particular, the invention relates to an image forming apparatus having an optical scanning device for emitting a light beam and scanning a surface of a photosensitive member with the light beam (exposing the surface to the light beam) as well as to the optical scanning device provided in the image forming apparatus.

2. Description of the Related Art

In electrophotographic image forming apparatus such as laser printers, a light beam that is emitted from a light emitting unit including a light source such as a semiconductor laser is deflected by a deflector such as a polygon mirror and a uniformly charged surface of a photosensitive member is scanned with (exposed to) the light beam to form a latent image. The latent image is visualized with toner and the toner image is transferred to a recording medium such as a recording sheet, whereby an image is formed on the recording medium.

As for a scanning device for emitting a light beam and scanning the photosensitive member surface with the light beam (exposing the photosensitive member surface to the light beam), it is necessary to assemble the light emitting unit, the polygon mirror, the scanning optical system for guiding a light beam to the photosensitive member, and other components in such a manner that they are positioned with high accuracy. Therefore, in many cases, the scanning device is manufactured as an optical scanning device in which the components are mounted in a resin-molded frame.

On the other hand, to a user who uses a printer in his or her home, it is convenient if a printer can be installed in a space that is not very wide, for example, on a desk. Therefore, the demand for the miniaturization of image forming apparatus such as laser printers is great. However, if lenses as components of the scanning optical system are reduced in height to miniaturize the optical scanning device, it is necessary to adjust the position of an emitted light beam more accurately.

JP-A-2001-108922 discloses an exemplary method for adjusting the position (in particular, the position in the sub-scanning direction that is perpendicular to the scanning direction of the deflector such as a polygon mirror) of a light beam.

In general, in such optical scanning device, a laser beam emitted from a light source is deflected for scanning in the main scanning direction by a polygon mirror and then guided to the surface of the photosensitive drum by lenses and mirrors. To adjust the write start position of an image on the photosensitive drum, such optical scanning devices are also equipped with a detecting unit for detecting, to produce a sync signal, part of a laser beam that has been deflected for scanning by the polygon mirror.

To miniaturize or reduce the cost of an optical scanning device, it is preferable that the detecting unit be small in size. However, since the light-receiving surface of a small detecting unit is also small, there may occur a case that a laser beam does not shine on the light-receiving surface properly because of influence of mounting errors of mirrors, etc., for guiding the laser beam to the detecting unit.

In view of the above, an image forming apparatus having the following configuration was proposed in which the position of the detecting unit can be adjusted so that a laser beam shines on the detecting unit properly.

That is, a support plate that holds a BD (beam detector) unit in which a BD sensor as the detecting unit, a BD lens for condensing a laser beam onto the BD sensor, and a slit plate for reducing the light quantity to prevent saturation of the BD sensor are unitized is fixed to a side plate of the main body in such a manner that its position can be adjusted. More specifically, the main body side plate is formed with a pair of embossed slide guides and the support plate that holds the BD unit is formed with long holes in which the respective embossed slide guides of the main body side plate are inserted. After the mounting position of the BD unit is adjusted so that a laser beam shines on the center of the light-receiving portion of the BD unit by moving the support plate vertically together with the BD unit, the support plate is screwed to the main body side plate (refer to JP-A-2000-255096).

The above configuration enables, in initial assembling, an adjustment for causing a laser beam to shine on the BD sensor properly.

SUMMARY OF THE INVENTION

In the technique disclosed in JP-A-2001-108922, an LD unit having a laser diode is provided with a vertical shaft below to which a rack is attached. A gear attached to the tip of a motor is engaged with the rack, and the position of the LD unit in the sub-scanning direction is controlled by controlling the rotation amount of the motor.

However, a certain level of play usually exists between the gear and the rack, and hence this technique is not necessarily suitable to control the position of a laser beam in the sub-scanning direction with high accuracy, for example, in the case where a scanning lens is reduced in height.

The present invention provides an image forming apparatus and an optical scanning device that are miniaturized by reducing the height of a scanning lens.

Also, in the configuration of JP-A-2000-255096, the position of the BD sensor that is an electronic component is adjusted. However, since the BD sensor as an electronic component is connected to other electronic components via a circuit board or the like, a problem may arise that the subject portion whose position is made adjustable is increased in size or the BD sensor becomes prone to disturbance such as noise because a harness or the like is used to accommodate positional variations between the electronic components. As such, the configuration in which the position of an electronic component has various problems.

The present invention provides an optical scanning device that allows detecting unit to detect a laser beam properly without the need for adjusting the position of the detecting unit itself.

According to one aspect of the present invention, there is provided an image forming apparatus including an optical scanning device that emits a light beam and scans a surface of a photo sensitive member with the light beam, the optical scanning device having: a holder mounted with a light source that emits the light beam, a collimator lens that converts the emitted light beam to approximately collimated beam, and a slit that interrupts a part of the collimated beam; a deflector having a reflecting surface, the deflector deflecting the light beam emitted from the light source; a cylindrical lens that focuses the light beam that has passed through the slit onto the reflecting surface of the deflector; and a frame having a base stage that is mounted with the deflector and the cylindrical lens; wherein the holder is fixed to the frame by bonding with an adhesive in such a manner that a bottom end portion of the holder is spaced from a top surface of the base stage.

According to another aspect of the present invention, there is provided an optical scanning device that emits a light beam and scans a scanning subject with the light beam, including: a holder mounted with a light source that emits the light beam, a collimator lens that converts the emitted light beam to approximately collimated beam, and a slit that interrupts a part of the collimated beam; a deflector having a reflecting surface, the deflector deflecting the light beam emitted from the light source; a cylindrical lens that focuses the light beam that has passed through the slit onto the reflecting surface of the deflector; and a frame having a base stage that is mounted with the deflector and the cylindrical lens; wherein the holder is fixed to the frame by bonding with an adhesive in such a manner that a bottom end portion of the holder is spaced from a top surface of the base stage.

In this configuration, the position of the holder is fixed by bonding with an adhesive in such a manner that the bottom end portion of the holder mounted with the light source is spaced from the top surface of the base stage of the frame. This makes it possible to determine the position of a light beam with high accuracy and to accommodate height reduction of a scanning lens. This is also effective as a countermeasure in the case where the accuracy of the deflector is somewhat lowered due to cost reduction. Another advantage is as follows. As for the way of accommodating, for example, height reduction of a scanning lens, it is satisfactory to fix a positional relationship at the beginning, that is, it is not necessary to adjust the position when necessary as in the technique of JP-A-2001-108922. Bonding is done with an adhesive, and hence a motor or the like for a position adjustment is not necessary.

The bottom end portion of the holder may be provided with a plate-like member that gives the holder a flat bottom surface. However, the bottom end portion need not always be provided with a plate-like member or have a flat surface. No particular limitations are imposed on the bonding positions. The holder bottom surface and the top surface of the base stage may be bonded to each other with a space formed in between by introducing a resin adhesive to the space. Portions of the holder other than its bottom surface may be bonded to the frame, and further, separate members for bonding may be provided.

The image forming apparatus and the optical scanning device can adjust the position of a light beam with high accuracy and hence can accommodate a case that a scanning lens is reduced in height. This results in an advantage that the entire image forming apparatus can be miniaturized by miniaturization of the optical scanning device.

According to still another aspect of the present invention, there is provided an optical scanning device including: an emitting unit that emits a laser beam; a deflector that deflects the laser beam emitted from the emitting unit for scanning in a main scanning direction; a detecting unit that detects, to produce a sync signal, a part of the laser beam deflected for scanning by the deflector; a sync signal optical element disposed on a laser beam path from the deflector to the detecting unit and having converging power at least in an sub-scanning direction that is perpendicular to a scanning plane that is formed by a scan of the laser beam; and an adjusting unit that adjusts a position of the sync signal optical element in the sub-scanning direction with respect to the detecting unit.

That is, in this optical scanning device, the laser beam incident position on the detecting unit can be moved in the sub-scanning direction by adjusting, in the sub-scanning direction, the position of the sync signal optical element having converging power in the sub-scanning direction.

Therefore, according to this optical scanning device, an adjustment for allowing the detecting unit to detect a laser beam properly can be made without the need for adjusting the position of the detecting unit itself.

BRIEF DESCRIPTION OF THE DRAWINGS

The present invention may be more readily described with reference to the accompanying drawings:

FIG. 7 is a perspective view illustrating how the LD holder is mounted on the base stage;

FIG. 13 is a perspective view of the BD lens in a state that it is supported by a support member;

DETAILED DESCRIPTION OF THE PREFERRED EMBODIMENTS

First Embodiment

An embodiment of the present invention will be hereinafter described with reference to the drawings.

(1) Total Configuration of Laser Printer

Figure 1:
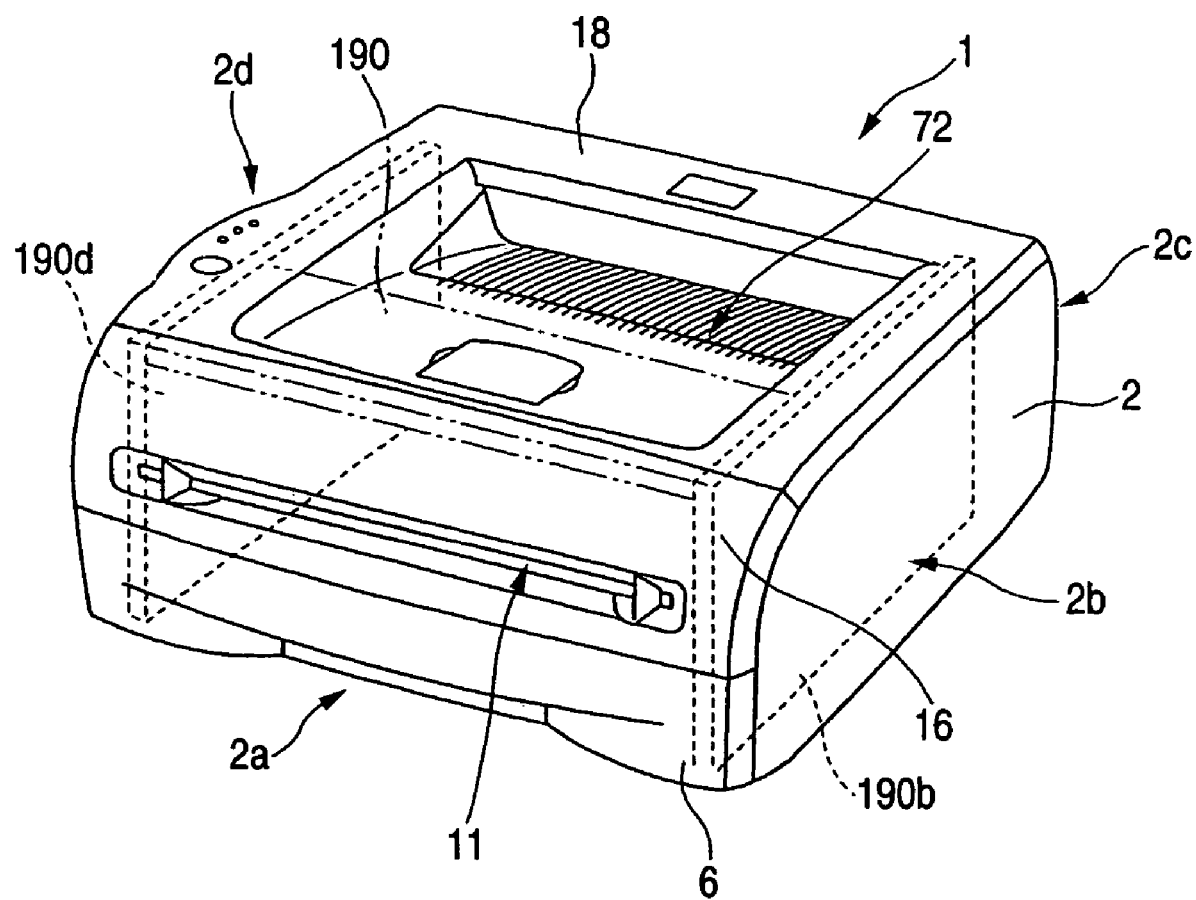
FIG. 1 is a perspective view showing an appearance of a laser printer as an example of an image forming apparatus as an application subject of the present invention.

FIG. 1 is a perspective view showing an appearance of a laser printer 1 as an example of an image forming apparatus.

The laser printer 1 of this figure is provided with a casing 2 having a top cover 18 that serves as a top wall and four side walls 2a, 2b, 2c, and 2d (the side walls 2c and 2d are not seen in FIG. 1) The top cover 18 is recessed toward the inside of the casing 2, whereby a sheet ejection tray is formed. A sheet supply cassette 6 capable of accommodating plural recording media such as recording sheets is disposed so as to be able to be inserted and removed from the side of the front side wall 2a of the casing 2. The front side wall 2a is provided with a manual feed tray 11 to be used for setting one recording medium each time as well as a front cover 16 that can be opened.

As indicated by imaginary lines in FIG. 1, a pair of side frames 190b and 190d are disposed inside the confronting side walls 2b and 2d, respectively, and a rigid plate 190 such as a steel plate bridges the side frames 190b and 190d. The side frames 190b and 190d are steel plates or are molded of a resin such as polystyrene or ABS. A optical scanning device 100 (not shown in the figure) is disposed under and fixed to the rigid plate 190.

Figure 2:
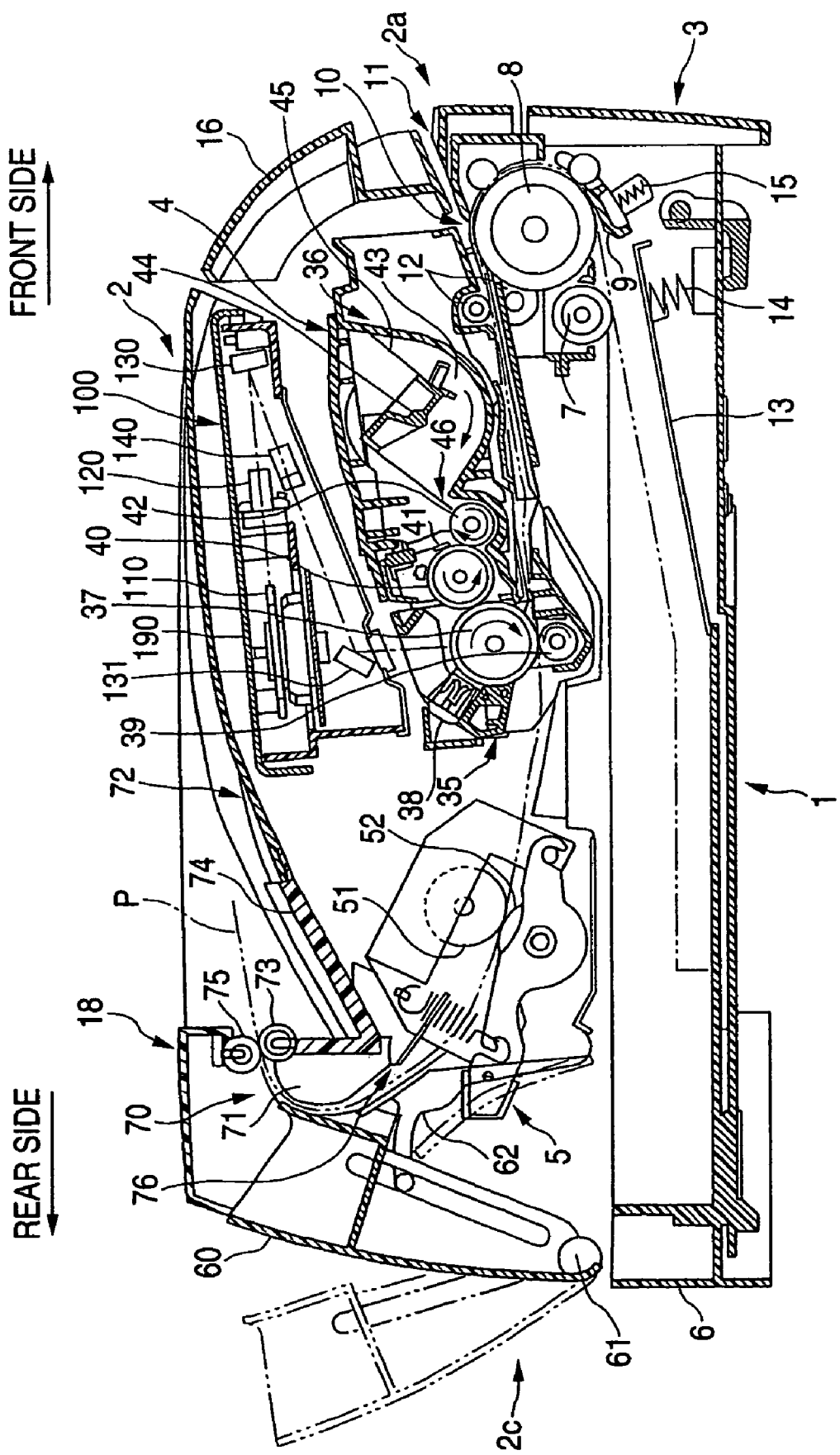
FIG. 2 is a schematic side sectional view of the laser printer.

The configuration of the laser printer 1 will be described below in more detail with reference to FIG. 2. FIG. 2 is a schematic side sectional view of the laser printer 1 as viewed from the side of the side wall 2d.

The laser printer 1 is provided with, in the casing 2 having the top cover 18, the front cover 16 that is attached to the front side wall 2a, a rear cover 60 that is part of the rear side wall 2c, and other parts, a sheet feed unit 3 for feeding a recording medium such as a recording sheet (in the figure, a recording medium transport path is indicated by an imaginary line P), a process cartridge 4 for forming a toner image as a visible image on a supplied recording medium, a fixing unit 5 for fixing, on the recording medium, the toner image formed on the recording medium, a sheet ejection unit 70 for ejecting the recording medium that has passed through the fixing unit 5, and other components. In this specification, of the front and rear side walls arranged in the recording medium transport direction that are part of the four side walls 2a-2d of the casing 2, the side wall (right-hand side wall in FIG. 2) located on the side where the front cover 16 is disposed is called "front side wall 2a" and the other side wall is called "rear side wall 2c."

The sheet feed unit 3 includes the sheet supply cassette 6 and sheet feed rollers 7 and 8 and a sheet feed pad 9 that are disposed above the tip side (front side) end, in the sheet transport direction, of recording media that are stacked in the sheet supply cassette 6. A sheet feed path 10 as the recording medium transport path along which a recording medium supplied from the sheet supply cassette 6 is reversed and transported to a bottom portion of the process cartridge 4 is formed in the sheet feed unit 3. The sheet feed unit 3 is provided with a registration roller pair 12 adjacent to the sheet feed path 10. Not only a recording medium in the sheet supply cassette 6 but also a recording medium (e.g., recording sheet) that is set manually in the manual feed tray 11 is supplied to the sheet feed path 10. In either case, the recording medium is stopped at the registration roller pair 12 and then supplied to an image forming unit of the process cartridge 4 with timing suitable for image formation in the process cartridge 4.

The sheet supply cassette 6 is disposed under the process cartridge 4 and the fixing unit 5 and is attached so as to be able to be inserted and removed from the side of the front side wall 2a of the casing 2. A sheet push-up plate 13 and a spring 14 are disposed in the sheet supply cassette 6. Recording media can be stacked on the sheet push-up plate 13, and the sheet push-up plate 13 is supported swingably at its one end portion that is far from the sheet feed roller 7, whereby the other end portion that is near the sheet feed roller 7 is movable in the vertical direction. The spring 14 is provided so as to urge the back surface of an end portion, close to the sheet feed roller 7, of the sheet push-up plate 13 upward. Therefore, the sheet push-up plate 13 is swung downward with its end portion far from the sheet feed roller 7 as a supporting point against the urging force of the spring 14 as the number of loaded recording media increases.

The sheet feed roller 8 and the sheet feed pad 9 are opposed to each other, and the sheet feed pad 9 is pressed against the sheet feed roller 8 by a spring 15 that is disposed behind the sheet feed pad 9. The top one of the recording media stacked on the sheet push-up plate 13 is brought in contact with and pressed against the sheet feed roller 7 by the spring 14 from the back side of the sheet push-up plate 13. The top recording medium is taken by the sheet feed roller 7, sandwiched between the sheet feed roller 8 and the sheet feed pad 9, and then fed to the sheet feed path 10 while being separated from the other recording media as the sheet feed roller 8 rotates (one recording medium is fed each time).

A recording medium supplied from the sheet supply cassette 6 or the manual feed tray 11 is sent to the registration roller pair 12 that is disposed above the sheet feed roller 7. The registration roller pair 12 transports the supplied recording medium to an image formation position (i.e., a contact position of a photosensitive drum 37 and a transfer roller 39) in the process cartridge 4 after registering the recording medium. The front side wall 2a of the casing 2 is provided with the front cover 16. The front cover 16 is attached to the casing 2 in an openable manner, and the process cartridge 4 can be inserted and removed (replaced) through an opening that appears when the front cover 16 is opened.

The optical scanning device 100, which is located over the process cartridge 4, is provided with a laser diode 271 (see FIG. 3) for emitting a laser beam, a polygon mirror 110 as a deflector for deflecting the laser beam as it is rotationally driven at high speed by a polygon motor 112 (see FIG. 4), an fθ lens (first scanning lens) 120 for converging the laser beam in the scanning direction (main scanning direction) of the polygon mirror 110 and making the scanning speed on the photosensitive drum 37 constant, a cylindrical lens (second scanning lens) 140 for converging the laser beam in the sub-scanning direction (corresponds to the rotation direction of the photosensitive drum 37) that is perpendicular to the main scanning direction, a first path-folding mirror 130, and a second path-folding mirror 131, and other components.

As indicated by a chain line, a laser beam modulated according to image information and emitted from the laser diode 271 passes through or is reflected by the polygon mirror 110, the fθ lens 120, the first path-folding mirror 130, the cylindrical lens 140, and the second path-folding mirror 131 in this order and is then used for scanning the surface of the photosensitive drum 37 in the process cartridge 4 for exposure to the laser beam itself.

The rigid plate (in this embodiment, a steel plate) 190 is disposed under (i.e., inside) the top cover 18 so as to bridge the top portions of the side frames 190b and 190d (see FIG. 1) which are disposed inside the respective side walls 2b and 2d of the casing 2. The rigid plate 190 also serves as a top lid of the optical scanning device 100.

The process cartridge 4 includes a drum cartridge 35 and a development cartridge 36. The photosensitive drum 37, a charger 38, the transfer roller 39, etc., are disposed in the drum cartridge 35. As described above, the process cartridge 4 can be inserted into and removed from the casing 2 through an opening that appears when the front cover 16 is opened.

The development cartridge 36 is attached to the drum cartridge 35 in a detachable manner, and is equipped with a development roller 40, a layer thickness limiting blade 41, a supply roller 42, a toner hopper 43, etc.

The toner in the toner hopper 43 is agitated as an agitator 45 that is supported by a rotary shaft 44 is rotated in the direction indicated by an arrow. Toner is output through a toner supply opening 46 that is formed in a side wall of the toner hopper 43. The supply roller 42 is provided rotatably beside the toner supply opening 46, and the development roller 40 is opposed to the supply roller 42 so as to be rotatable. The supply roller 42 and the development roller 40 are brought in contact with each other so as to be compressed to a certain extent.

The development roller 40 is configured in such a manner that a metal roller shaft is covered with a roller made of a conductive rubber material. And the development roller 40 is rotationally driven in the direction indicated by an arrow (counterclockwise). A development bias is applied to the development roller 40. The layer thickness limiting blade 41 is disposed in the vicinity of the development roller 40. In the layer thickness limiting blade 41, a pressing portion made of insulative silicone rubber and having a semicircular cross section is provided at the tip of a blade main body made of a metal leaf spring material. The layer thickness limiting blade 41 is supported by the development cartridge 36 near the development roller 40, and the pressing portion is pressed against the development roller 40 by the elastic force of the blade main body.

Toner that is output through the toner supply opening 46 is supplied to the development roller 40 as the supply roller 42 rotates, and is charged positively by the friction between the supply roller 42 and the development roller 40. The toner supplied to the development roller 40 goes into the gap between the pressing portion of the layer thickness limiting blade 41 and the development roller 40, whereby a thin layer of toner having a constant thickness comes to be carried by the development roller 40.

The photosensitive drum 37 is disposed beside the development roller 40 so as to be opposed to it, and is supported by the drum cartridge 35 so as to be rotatable in the direction indicated by an arrow (clockwise). A drum main body of the photosensitive drum 37 is grounded, and its surface portion is a positively-chargeable photosensitive layer made of polycarbonate or the like.

The charger 38 is disposed on the top-left of the photosensitive drum 37 and is opposed to it with a prescribed distance from it. The charger 38 is a positively-charging scorotron charger that generates a corona discharge from charging wires made of tungsten or the like, and is configured so as to charge the surface of the photosensitive drum 37 positively and uniformly.

The transfer roller 39 is disposed under the photosensitive drum 37 so as to be opposed to it, and is supported by the drum cartridge 35 so as to be rotatable in the direction indicated by an arrow (counterclockwise). The transfer roller 39 is configured in such a manner that a metal roller shaft is covered with a roller made of a conductive rubber material. A transfer bias is applied to the transfer roller 39 during a transfer.

As the photosensitive drum 37 is rotated, the surface of the photosensitive drum 37 is charged positively and uniformly by the charger 38 and is then exposed to a laser beam coming from the optical scanning device 100, whereby an electrostatic latent image is formed. Then, the positively charged toner that is carried by the development roller 40 comes to contact the photosensitive drum 37. At this time, because of a development bias applied to the development roller 40, the toner is supplied to the electrostatic image formed on the surface of the photosensitive drum 37, that is, exposed portions of the surface of the photosensitive drum 37 where the potential is lowered due to the exposure to the laser beam, whereby the toner comes to be carried by the photosensitive drum 37 selectively and a toner image is thereby formed (inverted development).

Then, because of a transfer bias applied to the transfer roller 39, the toner image carried by the surface of the photosensitive drum 37 is transferred to a recording medium as the recording medium passes between the photosensitive drum 37 and the transfer roller 39.

The fixing unit 5 is disposed above the sheet supply cassette 6 and beside the process cartridge 4, that is, downstream of the process cartridge 4 in the recording medium transport direction. The fixing unit 5 is equipped with a heating roller 51 as a fixing roller having a heater inside and a pressing roller 52 that is opposed to and pressed against the heating roller 51.

In the fixing unit 5, the toner image (visible image) that has been transferred to the recording medium in the process cartridge 4 is thermally fixed as the recording medium passes between the heating roller 51 and the pressing roller 52. Then, the recording medium is sent out to a sheet ejection path 76 that is a recording medium transport path formed in the sheet ejection unit 70.

The sheet ejection unit 70 includes an inside guide member 71 and an outside guide member 62 that constitute the sheet ejection path 76, a lower sheet ejection roller 73 and an upper sheet ejection roller 75 that are a sheet ejection roller pair that is disposed in an ejection opening through which a recording medium is ejected onto a sheet ejection tray 72 that is part of the top cover 18, and a tray member 74 that is part of the sheet ejection tray 72.

The outside guide member 62 which partially forms the sheet ejection path 76 is swung backward in synchronism with opening of the rear cover 60 which is part of the rear side wall 2c of the casing 2. That is, when the rear cover 60 that is attached swingably via a hinge 61 is opened, the top portion of the outside guide member 62 is swung backward in synchronism with the opening of the rear cover 60. In this manner, when the rear cover 60 is opened, the sheet ejection path 76 is exposed through an opening that is formed in the rear side wall 2c of the casing 2.

The sheet ejection tray 72 is generally shaped like a rectangular plate in a plan view, its rear end portion is recessed toward the inside of the casing 2, and the sheet ejection tray 72 is inclined so as to go up gradually as the position goes from its rear end to the front side. The section of the sheet ejection tray 72 from its rear end to a halfway position of its slope that goes up gradually is a tray member 74, and the top surface of a front tip portion of the tray member 74 is in contact with the bottom surface of a tray-member-74-side end portion of the top cover 18 excluding the tray member 74.

The recording medium that has passed through the fixing unit 5 and has been sent to sheet ejection path 76 is moved up and its sheet traveling direction is reversed. The recording medium is sent to the pair of sheet ejection rollers 73 and 75 and ejected toward the front side onto the sheet ejection tray 72 via the pair of sheet ejection rollers 73 and 75. The rigid plate 190 is located right under the portion of the top cover 18 excluding the tray member 74.

(2) Detailed Configuration of Optical Scanning Device 100

Figure 3:
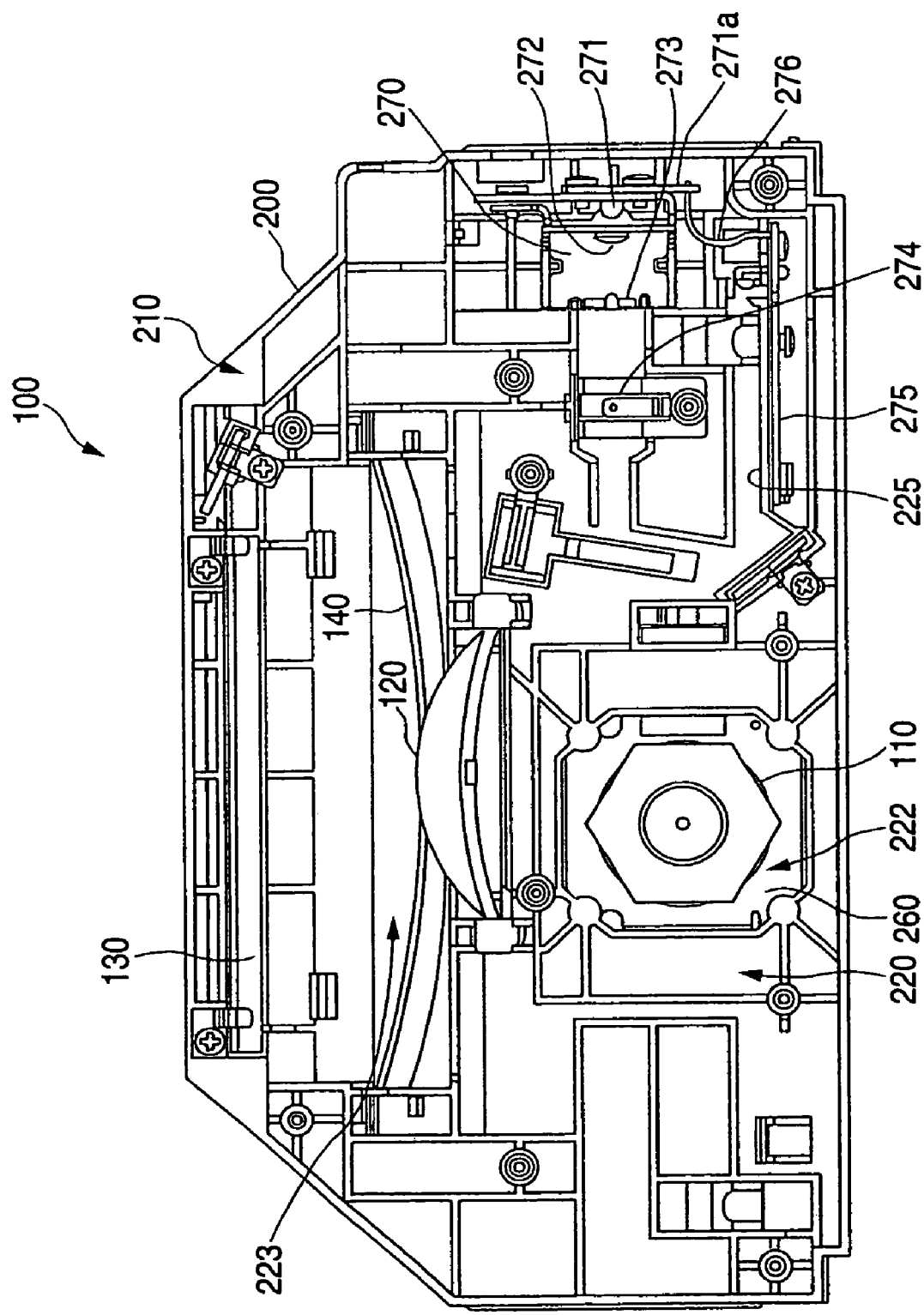
FIG. 3 is a top view illustrating the configuration of an optical scanning device according to a first embodiment.
Figure 4:
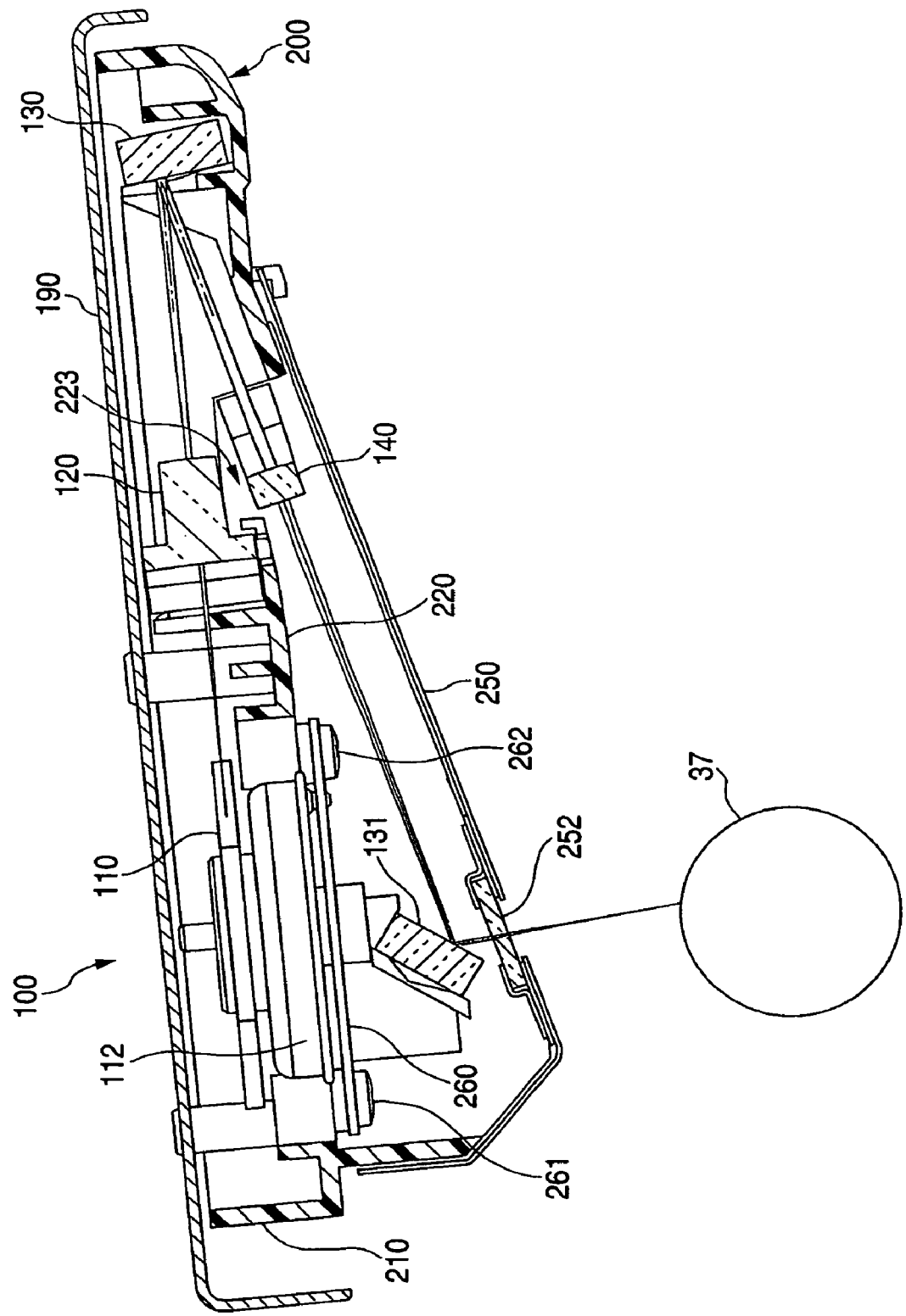
FIG. 4 is a schematic sectional view of the optical scanning device.

Next, the configuration of the optical scanning device 100 according to this embodiment will be described in detail. FIGS. 3 and 4 are a top view and a schematic sectional view, respectively, illustrating the configuration of the optical scanning device 100.

The optical scanning device 100 has an opening 223 through which a laser beam goes from the side (front side) where the first path-folding mirror 130 is disposed to the side (back side) where the second path-folding mirror 131 is disposed. And the optical scanning device 100 is equipped with a frame 200 that includes a flat-plate-shaped base stage 220 on which the polygon mirror 110, the fθ lens 120, and other components are mounted and an outer circumferential portion 210 as an outer circumferential wall (side wall) that surrounds the base stage 220 (see FIG. 3). For example, the frame 200 can be formed integrally by injection-molding a resin containing glass fiber.

The portion of the base stage 220 where the polygon motor 112 (see FIG. 4) for rotationally driving the polygon mirror 110 is mounted is formed with an opening 222 (see FIG. 3) and a substrate 260 on which the polygon motor 112 is mounted is attached tightly to the base stage 220 with screws 261 and 262 from under the opening 222 (see FIG. 4), whereby the optical scanning device 100 is made thinner.

The base stage 220 is also mounted with an LD holder 270 that is mounted with the laser diode 271 that is mounted on a circuit board 271a and emits a laser beam, a collimator lens 272 for collimating the emitted laser beam into collimated beam, and a slit plate 273 having a slit for shaping the collimated beam by interrupting part of it (see FIG. 3). Although in this embodiment the LD holder 270 is formed by working on a metal plate such as a steel plate, no particular limitations are imposed on its material. However, it is preferable that the LD holder 270 be made of a material having a smaller thermal expansion coefficient than the material of the frame 200 including the base stage 220 does because such a material selection can suppress a laser beam positional deviation due to heat.

An LD control board 275 for controlling the driving of the laser diode 271 is mounted on a board mounting portion 225 that is disposed inside the outer circumferential portion 210 and projects upward from the base stage 220 parallel with the outer circumferential wall. And the LD control board 275 is connected, via a harness 276, to the circuit board 271a which is mounted with the laser diode 271 (see FIG. 3). Separately providing, in this manner, the circuit board 271a mounted with the laser diode 271 and the LD control board 275 for controlling the driving of the laser diode 271 makes it unnecessary to provide a large-size circuit board 271a and hence effective in miniaturizing the optical scanning device 100. The board mounting portion 225 is formed integrally with the base stage 220 by injection molding.

The laser beam that has been emitted from the laser diode 271 and has passed through the slit plate 273 is converged by a cylindrical lens 274 in the sub-scanning direction that is perpendicular to the main scanning direction and reaches a reflecting surface of the polygon mirror 110 (for a surface tilt correction). The laser beam that has reached the reflecting surface is deflected by the polygon mirror 110 being rotated at high speed, passes through the fθ lens 120 while diverging again, is reflected by the first path-folding mirror 130, and goes toward the portion under (i.e., on the back side of) the base stage 220. Then, the laser beam passes through the cylindrical lens 140, is reflected by the second path-folding mirror 131, passes through a glass plate 252 that is attached to a bottom lid 250 of the optical scanning device 100, and is used for scanning the surface of the photosensitive drum 37 for exposure to the laser beam itself (see FIG. 4).

In this embodiment, to make the optical scanning device 100 thinner, the height of the cylindrical lens 140 in the sub-scanning direction is set as low as about 6 mm. Therefore, to allow a laser beam to pass through the cylindrical lens 140 reliably, it is necessary to control the position of the laser beam more accurately. This is because if the position of a laser beam is deviated in the sub-scanning direction, the laser beam may pass through the cylindrical lens 140 at a position that is out of its effective area.

In view of the above, the optical scanning device 100 according to this embodiment makes it possible to adjust the position of a laser beam with high accuracy by bonding (fixing) the LD holder 270 to the base stage 220 with an adhesive in a state that the bottom end portion of the LD holder 270 is separated above from the base stage 220.

Figure 5:
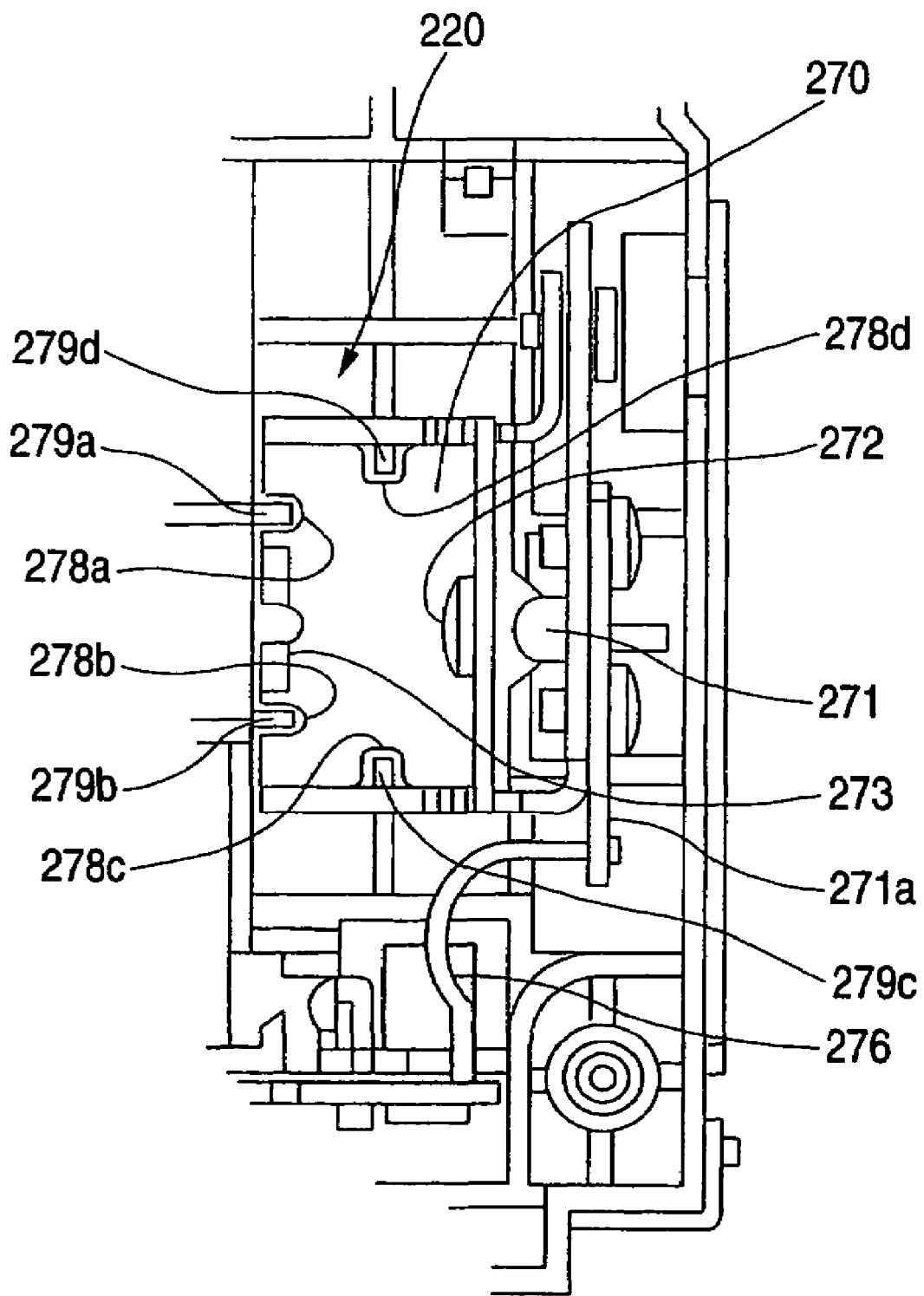
FIG. 5 is a top view showing the structure of a portion of a base stage to be mounted with an LD holder.
Figure 6A:
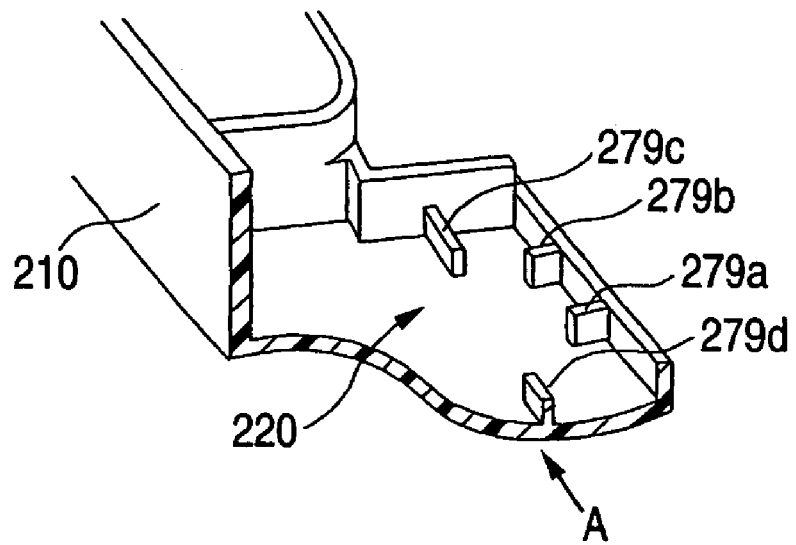
FIG. 6A is a perspective view showing the portion of the base stage to be mounted with the LD holder.
Figure 6B:
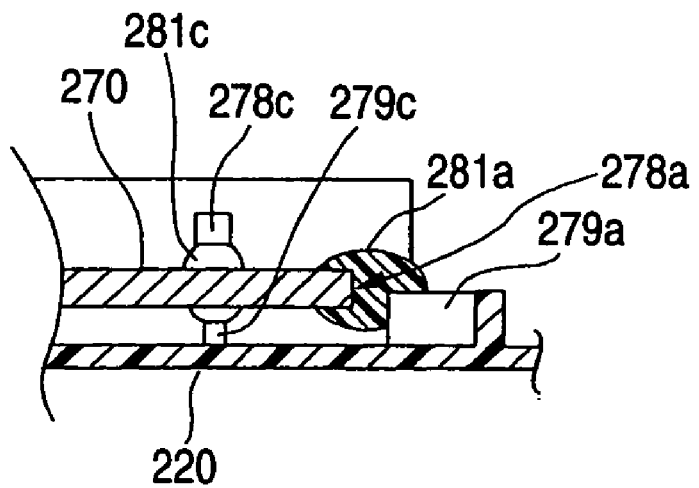
FIG. 6B is a sectional view, as viewed from the direction indicated by arrow A in FIG. 6A, showing a state that the LD holder is bonded to the base stage with an adhesive.

FIG. 5 is a top view showing the structure of a portion of the base stage 220 to be mounted with the LD holder 270 (a partial enlarged view of FIG. 3; no adhesive is shown in FIGS. 3 and 5). FIG. 6A is a perspective view showing this portion of the base stage 220, and FIG. 6B is a sectional view, as viewed from the direction indicated by arrow A in FIG. 6A, showing a state that the LD holder 270 is bonded to the base stage 220 with an adhesive (a projection 279d is omitted). FIG. 7 is a perspective view illustrating how the LD holder 270 is mounted on the base stage 220.

In this embodiment, projections 279a-279d are provided at four locations of the base stage 220 (see FIGS. 5 and 6A). On the other hand, the LD holder 270 is formed with cuts 278a-278d (see FIGS. 5 and 7). The cuts 278a-278d are fitted with the respective projections 279a-279d in a state that the bottom end portion of the LD holder 270 (in this embodiment, the bottom surface of the LD holder 270) is separated above from the base stage 220, and the vertical position of the LD holder 270 is adjusted while the state of an emitted laser beam is monitored. It is preferable that the position adjustment of the LD holder 270 be performed by using a device capable of adjusting the vertical position of the LD holder 270 while carrying it. The position adjustment itself may be performed manually.

The LD holder 270 is bonded to the base stage 220 with an adhesive in a state that a laser beam passes the LD holder 270 at a proper position with respect to it, whereby their positional relationship is fixed. In this embodiment, the projection 279b and the cut 278b are dedicated to the positioning. The boundary portions between cuts 278a, 278c, and 278d and the projections 279a, 279c, and 279d are filled with an ultraviolet curing resin and the ultraviolet curing resin is cured by illuminating it with ultraviolet light when the position adjustment has finished.

As shown in FIG. 6B, the holder 270 is fixed to the frame 200 with a space formed between the bottom end portion of the holder 270 and the base stage 220 by filling the space between the cut 278c and the projection 279c and the space between the cut 278a and the projection 279a with adhesives 281c and 281a, respectively (the space between the cut 278d and the projection 279d is also filled likewise).

The adhesive is not limited to an ultraviolet curing resin and may be an instant adhesive. Although these adhesives are preferable in that they enable very quick position fixing by bonding, the invention is not limited to the case of using one of these adhesives. To prevent an adhesive from sticking to nearby portions, the use of an ultraviolet curing resin is preferable.

The portions where bonding with an adhesive is effected are not limited to the boundary portions between the cuts 278a, etc., and the projections 279a, etc., and may be other portions. Depending on the material, etc., of the LD holder 270, a method of filling the space between the bottom surface of the LD holder 270 and the top surface of the base stage 220 with a resin adhesive is available. Even in this case, forming the projections 279a, etc., and the cuts 278a, etc., is suitable for positioning of the LD holder 270 in the horizontal direction. It goes without saying that bonding may also be effected between the cut 278b and the projection 279b.

In this embodiment, the projections 279a-279d and the cuts 278a-278d are formed at the locations shown in the drawings for convenience of bonding because the laser beam position adjustment is performed in a state that the LD holder 270 and the LD control board 275 are connected to each other by the harness 276. However, no particular limitations are imposed on their locations. However, to control the laser beam position with even higher accuracy, it is effective to form projections and cuts at two locations on a principal plane of the collimator lens 272.

In this embodiment, the plate-like member that gives a flat bottom surface to the LD holder 270 is used as the bottom end portion of the LD holder 270 and the top surface of the base stage 220 to be opposed to the above bottom surface is made a flat surface. This structure makes it possible to place the LD holder 270 on the top surface of the base stage 220 and then make a position adjustment while elevating the LD holder 270 gradually, and hence is suitable to prevent the LD holder 270 from tilting during the position adjustment. However, the bottom end portion having a flat bottom surface is not indispensable for enabling the bonding in a state that the bottom end portion of the LD holder 270 is separated above from the top surface of the base stage 220.

As described above, in the optical scanning device 100 according to this embodiment, the position of the LD holder 270 is fixed by bonding it to the base stage 220 with an adhesive in a state that the bottom end portion of the LD holder 270 is spaced from the base stage 220. This makes it possible to adjust the position of an emitted laser beam with higher accuracy and hence to miniaturize an image forming apparatus by reducing the height of a scanning lens. The position adjustment using an adhesive is also effective as a countermeasure in, for example, the case where the accuracy of the deflector such as a polygon mirror lowers as a result of cost reduction. This is because a laser beam can be adjusted so as not to go out of the effective area of a scanning lens even in the case where the deflector has a large surface tilt or the like.

(Modifications)

Although the embodiment of the invention has been described above, it goes without saying that the invention is not limited to the specific examples described in the embodiment. For example, the following modifications are possible.

(1) In the embodiment, the projections 279a-279d are formed in the base stage 220 and fitted in the cuts 278a-278d that are formed in the LD holder 270. However, the structure for the position adjustment of the LD holder 270 is not limited to such projections and cuts.

Figure 8:
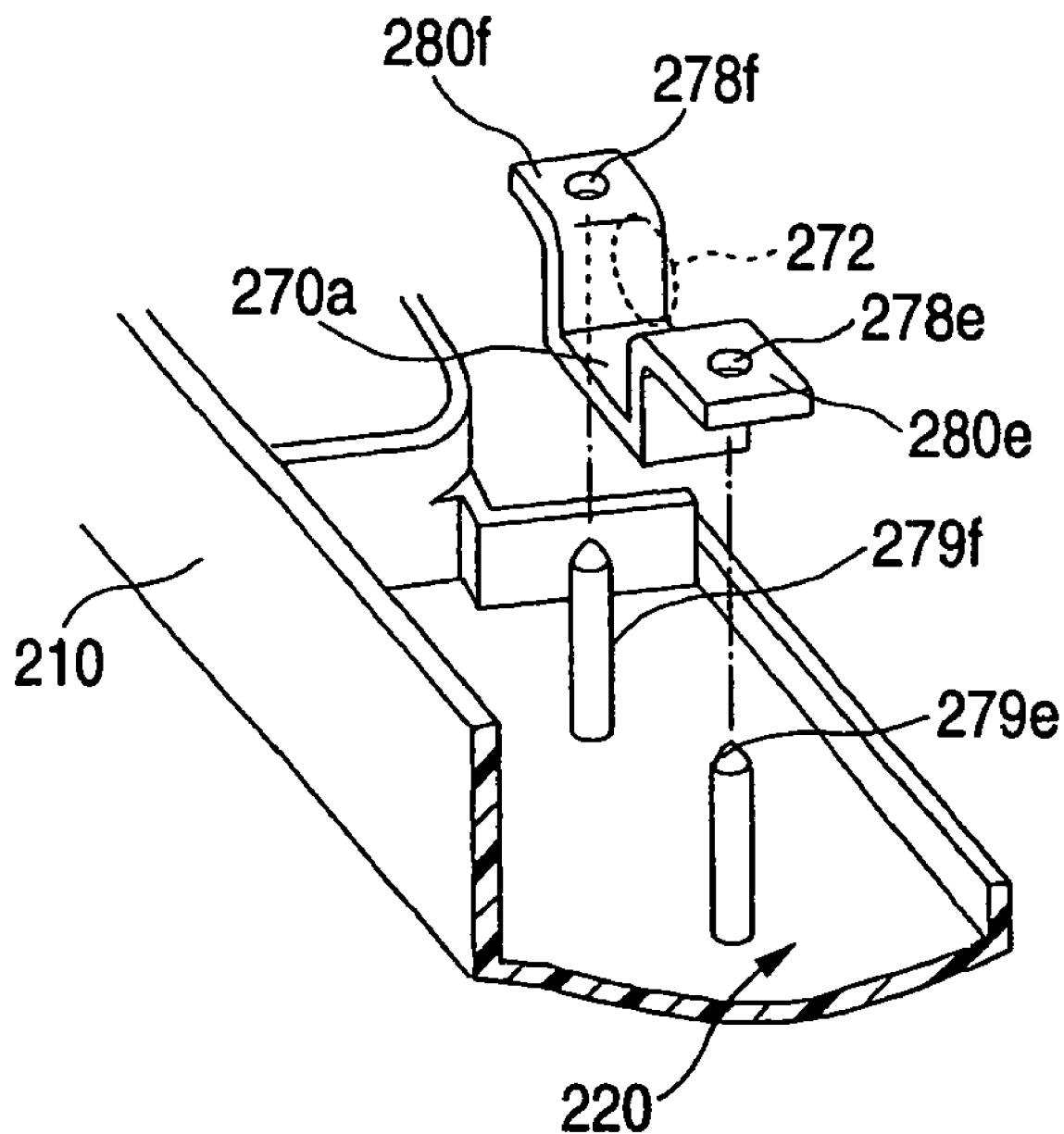
FIG. 8 is a perspective view illustrating how the LD holder is mounted on the base stage in a modification of the invention.

For example, a structure shown in FIG. 8 may be employed. Whereas two rod-shaped members 279e and 279f are implanted in the base stage 220 so as to be parallel with each other, a pair of extensions 280e and 280f extend from an LD holder 270a on both sides of the collimator lens 272 that is mounted on the LD holder 270a (the laser diode, the slit plate, etc., are omitted in the figure) and are formed with respective through-holes 278e and 278f at positions that are line-symmetrical with respect to the optical axis of the collimator lens 272.

With this structure, a laser beam position adjustment can be made in the same manner as in the above case of using the projections by bonding portions, around the through-holes 278e and 278f, the extensions 280e and 280f to the rod-shaped members 279e and 279f with an adhesive in a state that the rod-shaped members 279e and 279f are inserted in the respective through-holes 278e and 278f. In this case, the number of rod-shaped members is arbitrary and may be more than two. Although providing the through-holes 278e and 278f on both sides of the collimator lens 272 (at positions that are line-symmetrical with respect to its optical axis) is suitable for the position adjustment, the positions of the through-holes are not limited to those positions.

(2) Although in the embodiment, the LD holder 270 is bonded to the base stage 220 to fix the positional relationship between the LD holder 270 and the frame 200, the bonding positions are entirely arbitrary. The LD holder 270 may be bonded to the outer circumferential portion 210 or members for bonding may extend from the outer circumferential portion 210.

(3) In the embodiment, a laser beam reflected by the first path-folding mirror 130 directly enters the second path-folding mirror 131 which is disposed on the back side of the base stage 220. Although this optical path is suitable for the miniaturization of the optical scanning device 100, another structure is possible in which another path-folding mirror is disposed between the first path-folding mirror 130 and the second path-folding mirror 131.

(4) In the embodiment, the base stage 220 is formed with the opening 222 at the position where the polygon mirror 110 and the polygon motor 112 are to be disposed and the substrate 260 mounted with the polygon motor 112 is tightly attached to the base stage 220 from its back side. Although this structure is suitable for the thinning of the optical scanning device 100, another structure is possible in which the opening 222 is not formed and a substrate mounted with the polygon mirror 112 is disposed on the top surface side of the base stage 220.

(5) Although the embodiment employs the polygon mirror 110 and the polygon motor 112 as the deflector for deflecting a laser beam, the invention is not limited to such a case. For example, a galvanometer mirror or the like may be used, in which case the first scanning lens is not limited to the fθ lens 120 and may be a lens having another optical characteristic.

For example, the invention can be applied to image forming apparatus having an optical scanning device that emits a light beam and scans a scanning subject such as a photosensitive member as well as to such optical scanning devices.

Second Embodiment

Next, an optical scanning device 300 according to a second embodiment will be described.

Figure 9:
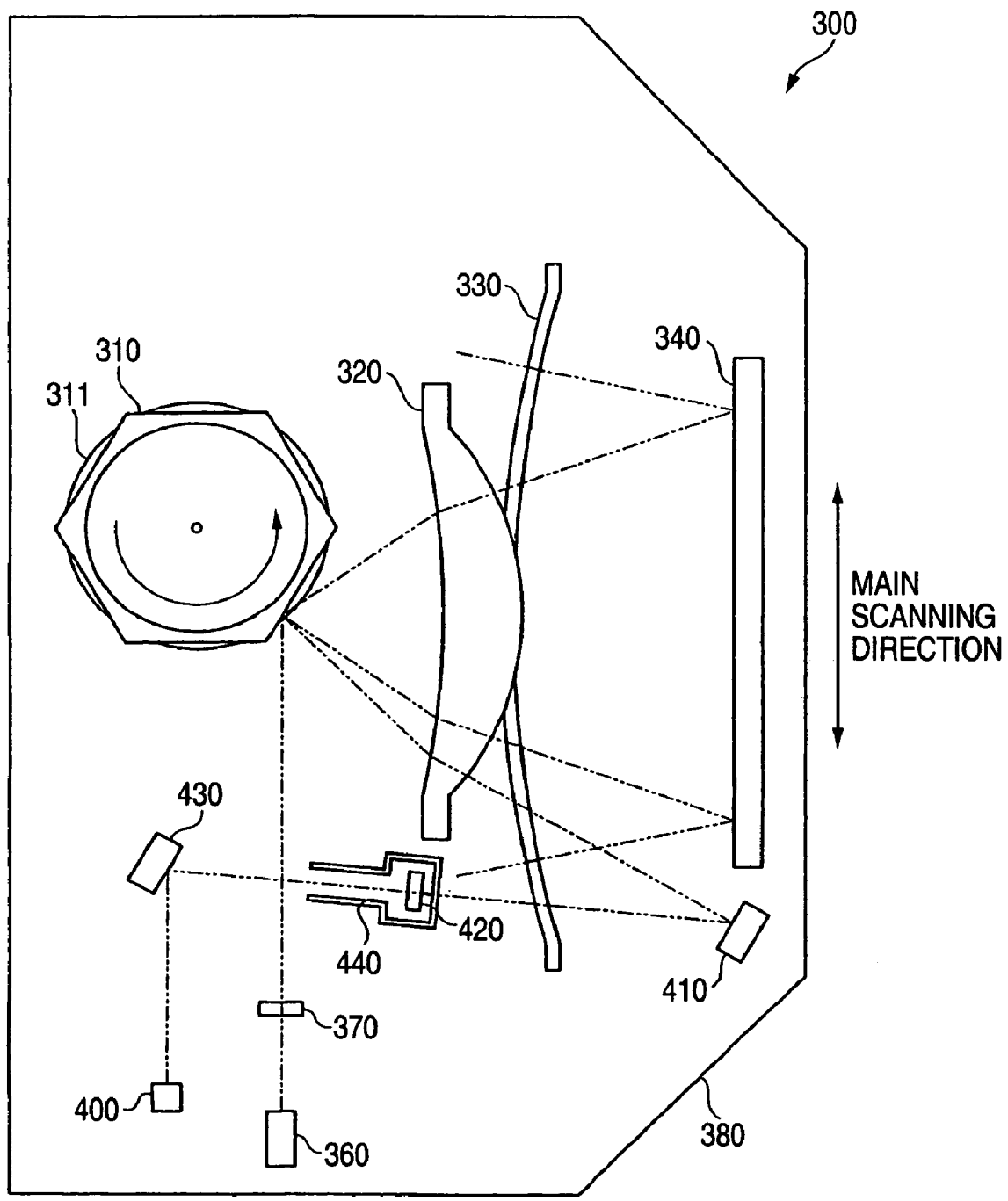
FIG. 9 is a plan view of the inside of an optical scanning device according to a second embodiment as viewed from above.

FIG. 9 is a plan view of the inside of the optical scanning device 300 as viewed from above.

As shown in the figure, the optical scanning device 300 is equipped with a laser emitting unit 360 that has a laser diode and a collimating lens and emits a laser beam, a cylindrical lens 370 for converging the laser beam emitted from the laser emitting unit 360, a polygon motor 311, polygon mirror 310, fθ lens 320, reflector 340, and cylindrical lens 330, and other components. These components are fixed to a resin frame 380.

The polygon mirror 310 is such that mirrors are attached to the respective surfaces of a regular prism (in this embodiment, a regular hexagonal prism). When rotationally driven by the polygon motor 311, the polygon mirror 310 deflects, for scanning in the main scanning direction, a laser beam emitted from the laser emitting unit 360.

The fθ lens 320 converts the laser beam as deflected by the polygon mirror 310 for a constant angular velocity scan to a laser beam for a constant speed scan.

The reflector 340 reflects the laser beam that has passed through the fθ lens 320 back to the cylindrical lens 330.

To focus the laser beam on the surface of the photosensitive drum 37, the cylindrical lens 330 has converging power in the sub-scanning direction.

Figure 10:
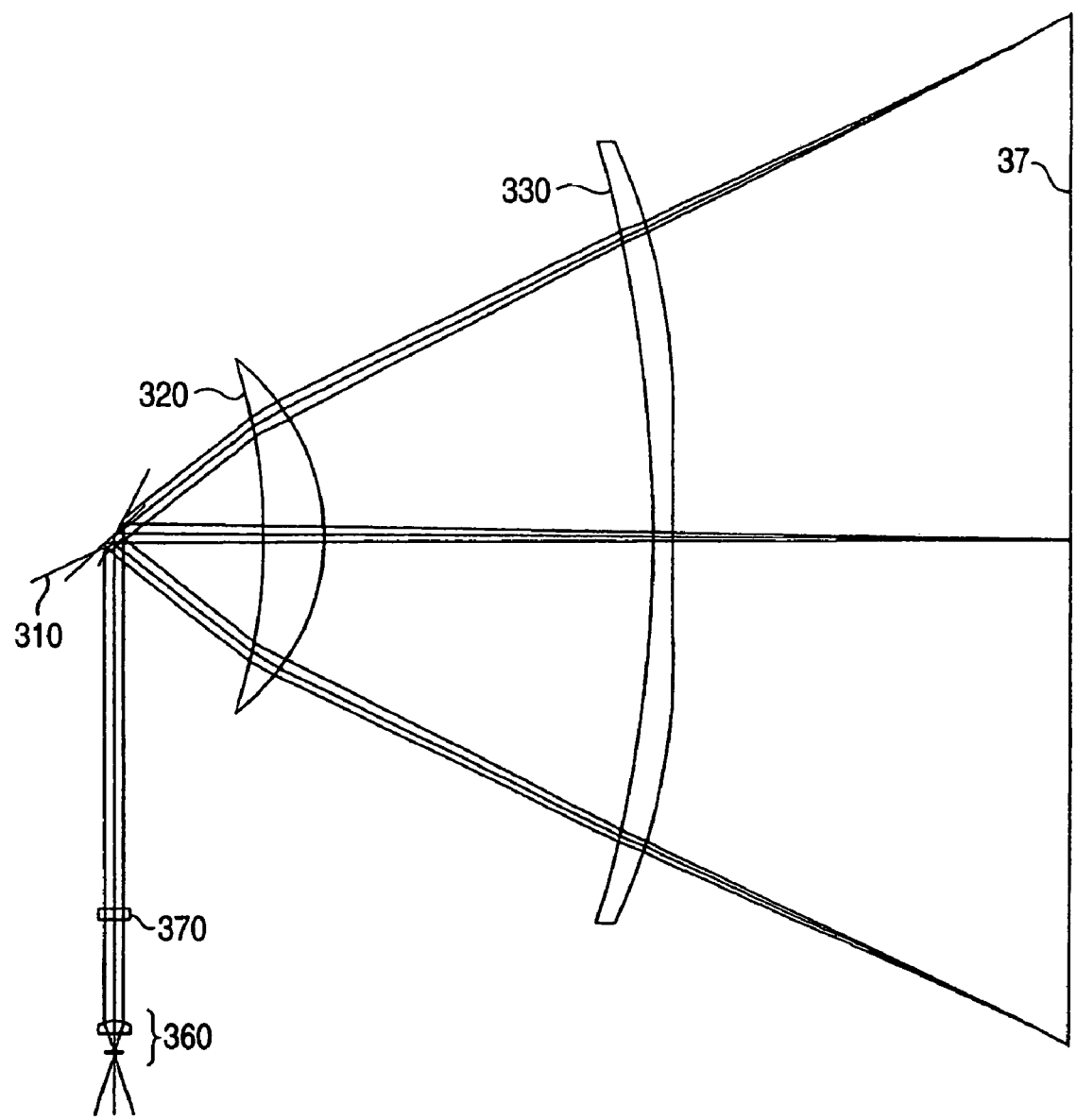
FIG. 10 illustrates a laser beam path that leads to a photosensitive drum.

With this configuration, as shown in FIG. 10, a laser beam emitted from the laser emitting unit 360 is converged in the sub-scanning direction by the cylindrical lens 370 and focused on the rotating polygon mirror 310. The laser beam is deflected for scanning in the main scanning direction as the polygon mirror 310 is rotated, passes through the fθ lens 320 and the cylindrical lens 330, and shines on the surface of the photosensitive drum 37.

On the other hand, as shown in FIG. 9, the optical scanning device 300 is equipped with a BD sensor 400 for detecting, to produce a sync signal, part of a laser beam that has been deflected for scanning by the polygon mirror 310. The optical scanning device 300 is also equipped with a reflector 410, a BD lens 420, and a reflector 430 as components for guiding the part of the laser beam to the BD sensor 400.

Figure 11:
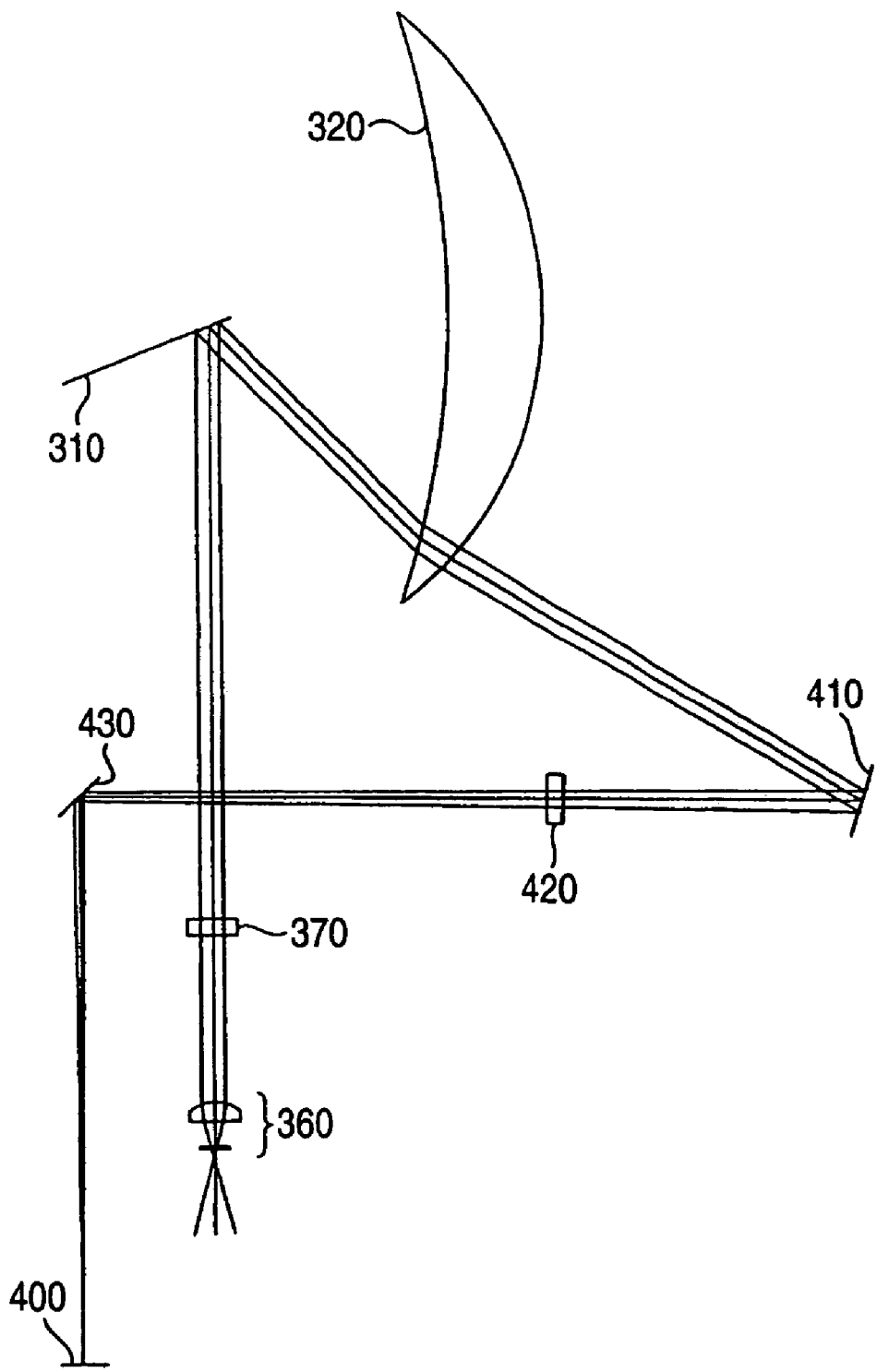
FIG. 11 illustrates a laser beam path that leads to a BD sensor.

A more specific description will be made with reference to FIG. 11. As described above, a laser beam emitted from the laser emitting unit 360 is deflected for scanning by the polygon mirror 310. Part of the laser beam that has passed through the fθ lens 320 is reflected by the reflector 410, passes through the BD lens 420, and is reflected again by the reflector 430, as a result of which the part of the laser beam shines on the BD sensor 400.

The BD lens 420, which is made of a resin, has the same optical characteristic (i.e., converging power in the sub-scanning direction) as the cylindrical lens 330 does through which the laser beam to be applied to the photosensitive drum 37 passes. That is, it is possible to construct the optical scanning device 300 so that a laser beam shines on the BD sensor 400 after passing through the cylindrical lens 330. However, the optical scanning device 300 of this embodiment is configured so that a laser beam shines on the BD sensor 400 without passing through the cylindrical lens 330, and hence a laser beam to be applied to the BD sensor 400 is caused to pass through the BD lens 420 having the same optical characteristic as the cylindrical lens 330 does so that this laser beam is subjected to the same conditions as a laser beam to be applied to the photosensitive drum 37 is.

A description will now be made of the shape of the BD lens 420 used in the optical scanning device 300.

Figure 12:
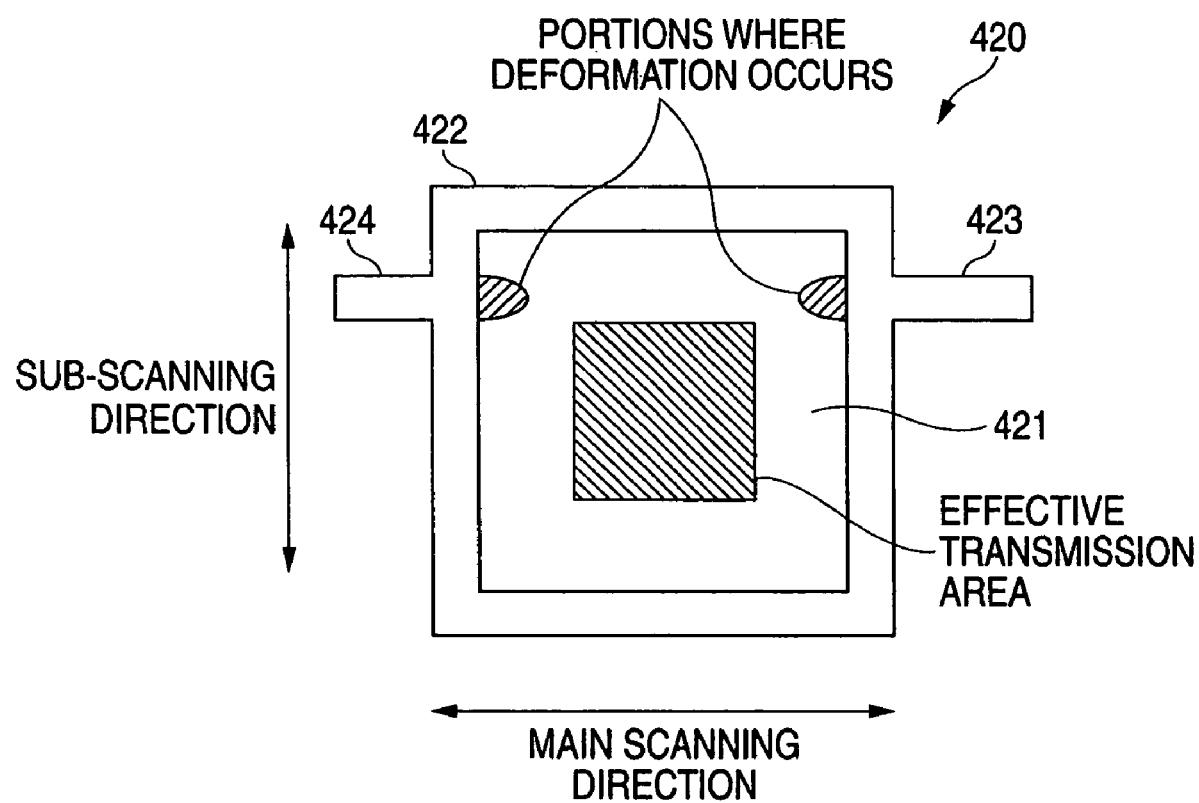
FIG. 12 is a plan view of a BD lens as viewed from a position on the optical axis.

FIG. 12 is a plan view of the BD lens 420 as viewed from a position on the optical axis of the BD lens 420 (i.e., a position on a traveling direction of a laser beam that is about to shine on the BD lens 420). FIG. 13 is a perspective view of the BD lens 420 in a state that it is supported by a support member 440 (described later).

As shown in these drawings, the BD lens 420 is shaped so as to have a rectangular lens main body 421 and a reinforcement rib 422 that extends in the optical axis direction on both sides from the periphery of the lens main body 421. Plate-like extensions 423 and 424 are formed at both ends, in the main scanning direction (i.e., the scanning direction of a laser beam to shine on the BD lens 420), of the BD lens 420 so as to extend outward in the main scanning direction.

The extensions 423 and 424 are formed at a position in the sub-scanning direction that is deviated from the center of the BD lens 420 in the sub-scanning direction. More specifically, as shown in FIG. 12, the extensions 423 and 424 are formed at a position in the sub-scanning direction that is out of the range, in the sub-scanning direction, of an effective transmission area (i.e., an area where the BD lens 420 exhibits its intended optical characteristics) so that the position, in the sub-scanning direction, of portions where deformation occurs due to the formation of the extensions 423 and 424 is out of the range of the effective transmission area.

Figure 14:
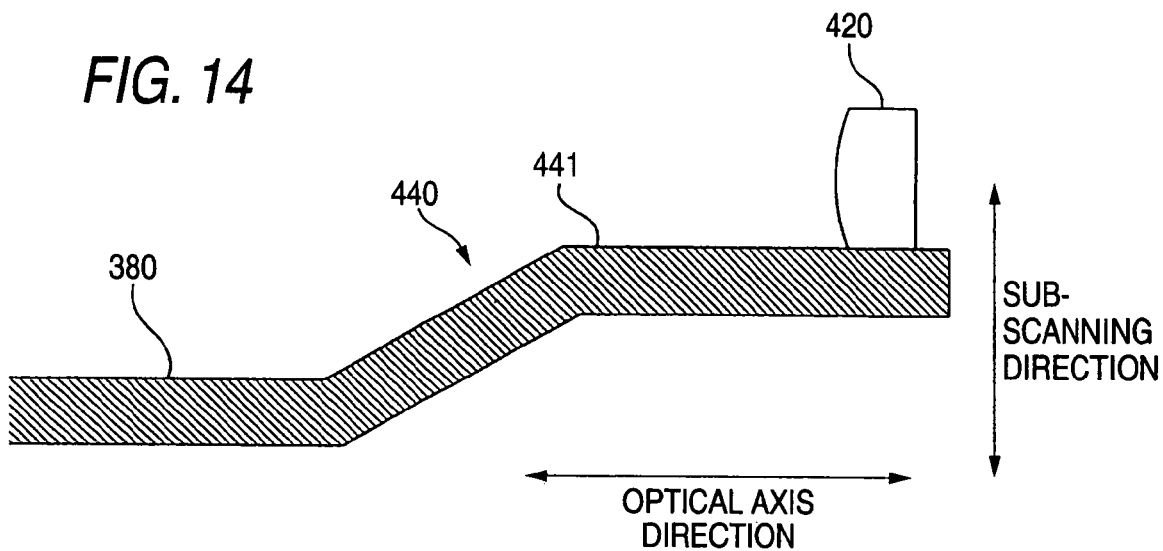
FIG. 14 illustrates the support member.

As shown in FIG. 13, the BD lens 420 is fixed to the support member 440 that is integral with the resin frame 380. The support member 440 has a cantilever-shaped main body 441 and two confronting walls 442 and 443 that extend right upward from a free end portion of the main body 441 and are opposed to each other. The tips of the confronting walls 442 and 443 serve as placement surfaces on which the extensions 423 and 424 of the BD lens 420 are placed, respectively. As also shown in FIG. 14, the BD lens 420 is supported so as to be movable in the sub-scanning direction with respect to the frame 380 in accordance with elastic deformation of the main body 441 of the support member 440.

As shown in FIG. 13, a threaded stage 450 that is formed with a threaded hole 451 extending perpendicularly to the bottom surface of the frame 380 is formed on the frame 380 beside the support member 440. A screw 452 for adjusting and fixing the position of the BD lens 420 is threadedly engaged with the threaded hole 451 of the threaded stage 450. More specifically, the head 452a of the screw 452 is in contact with the top surface of the extension 423 of the BD lens 420. If the screw 452 is advanced, the head 452a directly presses the BD lens 420 downward, whereby the main body 441 of the support member 440 is deformed elastically and the position of the BD lens 420 goes down. If the screw 452 is retreated, the position of the BD lens 420 goes up due to the elasticity of the main body 441 of the support member 440. That is, the position, in the sub-scanning direction, with respect to the BD sensor 400, of the BD lens 420 which is supported by the support member 440 can be adjusted and fixed by adjusting the degree of threaded engagement of the screw 452.

A variation of the laser beam path that is caused by adjusting the position of the BD lens 420 in the sub-scanning direction with respect to the BD sensor 400 will now be described with reference to FIGS. 15A and 15B.

Figure 15A:
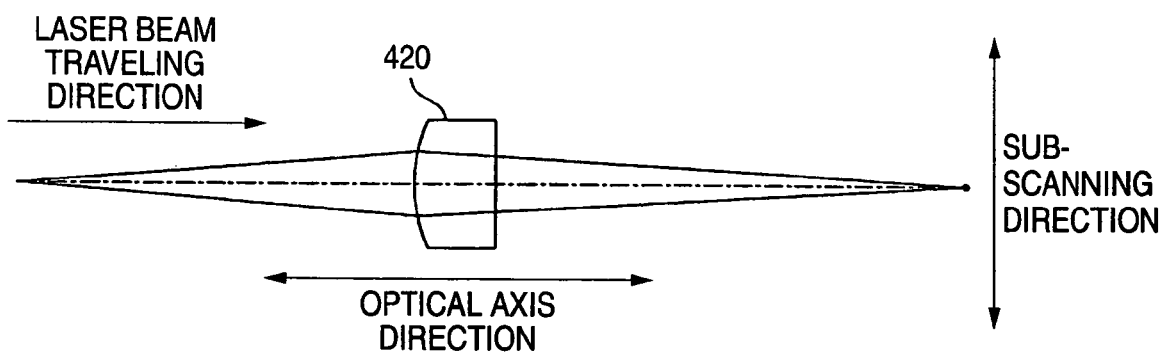
FIGS. 15A and 15B illustrates how the laser beam path is varied by adjusting the position of the BD lens in the sub-scanning direction with respect to the BD sensor.
Figure 15B:
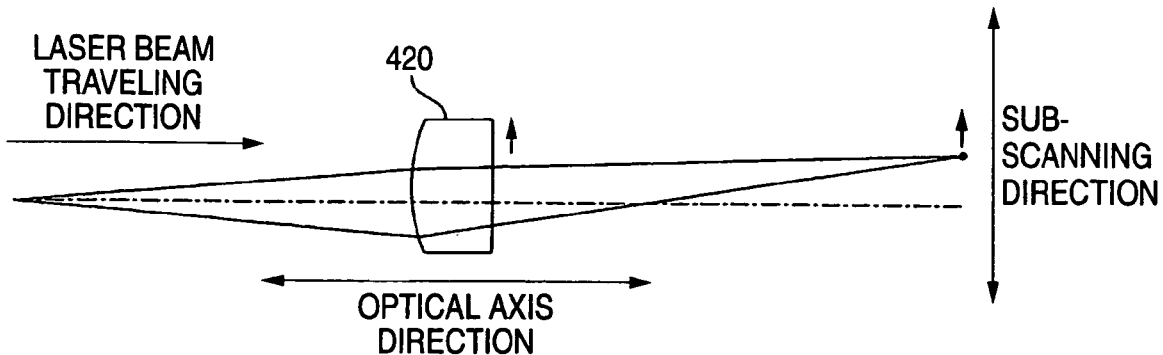

FIG. 15B shows how the laser beam path varies when the position of the BD lens 420 is deviated in the sub-scanning direction from the position shown in FIG. 15A. As shown in FIG. 15B, if the position of the BD lens 420 is adjusted upward in the sub-scanning direction, the focusing position of a laser beam passing through the BD lens 420 is also moved upward in the sub-scanning direction. That is, the focusing position of a laser beam in the sub-scanning direction can be adjusted by adjusting the position of the BD lens 420 in the sub-scanning direction. Therefore, in the optical scanning device 300, even if the BD sensor 400 has an error in its mounting position in the sub-scanning direction, it is possible to cause a laser beam to properly shine on the BD sensor 400 by adjusting the position of the BD lens 420.

That is, in a manufacturing process of the optical scanning device 300, after execution of a process of mounting various components on the frame 380 (e.g., a process of mounting the BD lens 420 on the support member 440), a process of adjusting the position, with respect to the BD sensor 400, of the BD lens 420 that is supported by the support member 440 is executed. More specifically, in a state that a laser beam is emitted from the laser emitting unit 360, the degree of threaded engagement of the screw 452 is adjusted with a tool such as a screwdriver so that the laser beam actually shines on the BD sensor 400 properly. The screw 452 is disposed beside the support member 440 at such a position as not to coextend with, in the main scanning direction, the path of a laser beam to shine on the BD sensor 400, the screw 452 or a screwdriver or the like does not interrupt a laser beam in adjusting the degree of threaded engagement of the screw 452 with the screwdriver or the like.

In the laser printer according to the embodiment, the laser emitting unit 360 functions as an emitting unit; the polygon mirror 310 functions as a deflector, the BD sensor 400 functions as a detecting unit, and the BD lens 420 functions as a sync signal optical element. The support member 440 functions as a support unit, the screw 452 functions as a positioning unit, confronting walls 442 and 443 functions as a placement portions, and the fθ lens 320 and the cylindrical lens 330 function as image forming optical elements.

As described above, in the optical scanning device 300 according to the embodiment, the incident position of a laser beam on the BD sensor 400 can be moved in the sub-scanning direction by adjusting, in the sub-scanning direction, the position of the BD lens 420 having converging power in the sub-scanning direction. Therefore, according to the scanning unit 300, in its manufacturing process, an adjustment for allowing the BD sensor 400 to detect a laser beam properly can be made without the need for adjusting the position of the BD sensor 400 itself. Further, since the position of the BD lens 420 in the sub-scanning direction can be varied by adjusting the degree of threaded engagement of the screw 452, a fine adjustment and fixing of the position of the BD lens 420 can be performed very easily. Still further, since the support member 440 is integral with the frame 380, the number of components can be made smaller than in a case that the support member 440 is separate from the frame 380.

The BD lens 420 has the extensions 423 and 424 that extend outward from both its ends in the main scanning direction and serve as positioning reference surfaces when the BD lens 420 is supported by the support member 440. Since in this manner the positioning reference surfaces for the support member 440 are provided at the positions of the BD lens 420 that are distant from each other, the positioning accuracy of the BD lens 420 with respect to the support member 440 can be increased. In particular, in the BD lens 420 according to the embodiment, since the extensions 423 and 424 are disposed at the position in the sub-scanning direction that is deviated from the center of the BD lens 420 in the sub-scanning direction (i.e., the top half and the bottom half of the BD lens 420 are not symmetrical), the BD lens 420 can be prevented from being mounted on the support member 440 so as to be oriented erroneously in the sub-scanning direction (vertical direction). In addition, since the extensions 423 and 424 are disposed at the position in the sub-scanning direction that is out of the range, in the sub-scanning direction, of the effective transmission area of the BD lens 420, a phenomenon that the formation of the extensions 423 and 424 influences a laser beam can be avoided.

In addition, in the optical scanning device 300, a laser beam to shine on the BD sensor 400 is taken before entering the cylindrical lens 330 (i.e., the laser beam does not pass through the cylindrical lens 330) because the BD lens 420 having the same optical characteristic as the cylindrical lens 330 does is used. This increases the degree of freedom of the placement of the BD lens 400 as exemplified by disposing the BD lens 400 on the front side of the optical scanning device 300 (i.e., the side where the polygon mirror 310, the fθ lens 320, etc., are disposed) rather than the back side of the optical scanning device 300 (i.e., the side where the cylindrical lens 330 is disposed) The optical scanning device 300 can thus be miniaturized.

Although the one embodiment of the invention has been described above, it goes without saying that the invention can be implemented in other various forms.

Figure 16:
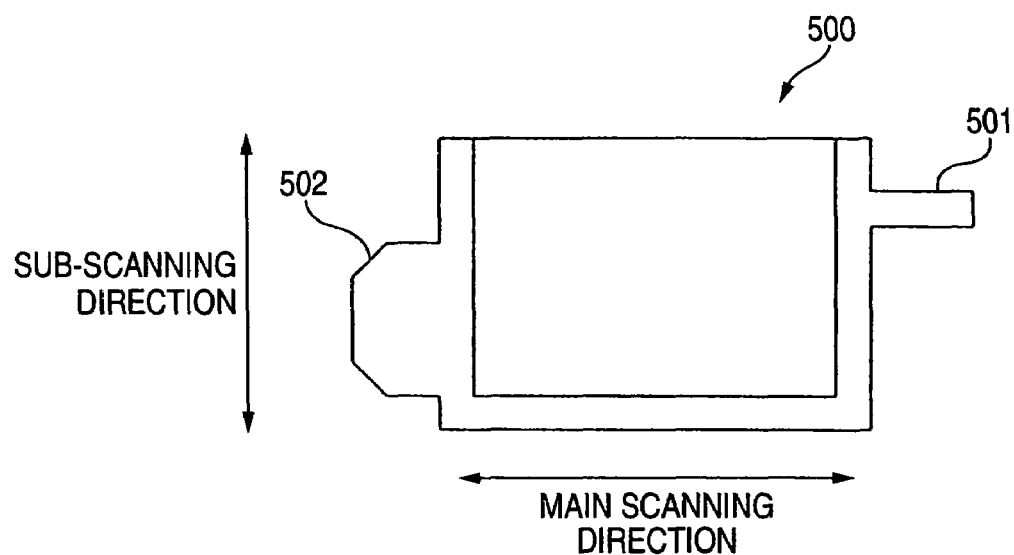
FIG. 16 illustrates a BD lens according to a modification.

For example, the shape of the BD lens 420 is not limited to the one described in the above embodiment. For example, a BD lens 500 shown in FIG. 16 can be employed in which the positions of right and left extensions 501 and 502 in the sub-scanning direction are different from each other and their shapes are entirely different from each other. Having such a structure, the BD lens 500 is prevented more reliably from being mounted with erroneous orientation. That is, the BD lens 500 can be prevented from being mounted so as to be oriented erroneously either in the main scanning direction (right-left direction) or in the sub-scanning direction (vertical direction).

Figure 17:
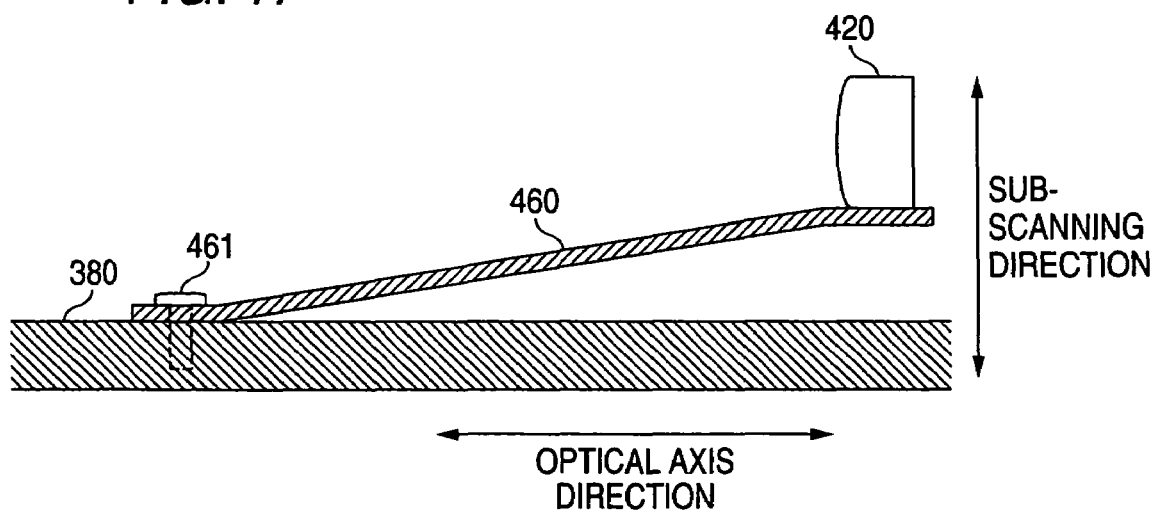
FIG. 17 illustrates a structure in which a leaf spring is used as a support member.

Although in the optical scanning device 300 according to the above embodiment the frame 380 and the support member 440 are formed integrally with a resin, the invention is not limited to such a case. For example, a structure shown in FIG. 17 is possible in which a leaf spring 460 is separate from the frame 380, one end portion of the leaf spring 460 is fixed to the frame 380 with a screw 461 or the like, and the BD lens 420 is supported by the other end portion of the leaf spring 460. This structure does not lower the strength of the frame 380, which is in contrast to the case of the structure that the support member 440 and the frame 380 are integral with each other.

Further, the frame and the support member may be formed integrally with sheet metal rather than a resin.

What is claimed is:

1. An optical scanning device comprising:
   an emitting unit for emitting a laser beam;
   a deflector for deflecting the laser beam emitted from the emitting unit to scan in a main scanning direction;
   a detecting unit for detecting to produce a sync signal, a part of the laser beam deflected for scanning by the deflector;
   a sync signal optical element disposed on a laser beam path from the deflector to the detecting unit and having converging power at least in an sub-scanning direction that is perpendicular to a scanning plane that is formed by a scan of the laser beam; and
   an elastically deformable adjusting unit for adjusting a position of the sync signal optical element in the sub-scanning direction with respect to the detecting unit.

2. The optical scanning device according to claim 1, wherein the adjusting unit comprises:
   a support unit for supporting the sync signal optical element in such a manner that the sync signal optical element is movable in the sub-scanning direction with respect to the detecting unit; and
   a positioning unit for positioning the sync signal optical element supported by the support unit with respect to the detecting unit.

3. The optical scanning device according to claim 2, further comprising a frame for accommodating the emitting unit, the deflector, the detecting unit, and the sync signal optical element and is provided with the support unit.

4. The optical scanning device according to claim 3, wherein the support unit has a cantilever shape and supports the sync signal optical element by a free end portion thereof.

5. The optical scanning device according to claim 4, wherein the support unit is integrally formed with the frame.

6. The optical scanning device according to claim 5, wherein the support unit and the frame are made of a resin.

7. The optical scanning device according to claim 4, wherein the support unit comprises a leaf spring, and one end portion of the leaf spring is fixed to the frame and the other end portion supports the sync signal optical element.

8. The optical scanning device according to claim 2, wherein the positioning unit comprises a threadedly engaging member and is configured to adjust the position of the sync signal optical element in accordance with the degree of threaded engagement of the threadedly engaging member.

9. The optical scanning device according to claim 8, wherein the threadedly engaging member changes the position of the sync signal optical element by moving in accordance with the degree of threaded engagement while keeping in contact with the sync signal optical element.

10. The optical scanning device according to claim 8, wherein the threadedly engaging member is disposed at such a position as not to coextend with the path of the laser beam path from the deflector to the detecting unit in the main scanning direction.

11. The optical scanning device according to claim 2, wherein the sync signal optical element has extensions that extend outward from both ends of the sync signal optical element in the main scanning direction; and
the support unit has placement portions on which the extensions of the sync signal optical element are placed, respectively.

12. The optical scanning device according to claim 11, wherein the extensions that are formed at both ends of the sync signal optical element in the main scanning direction are located at different positions in the sub-scanning direction.

13. The optical scanning device according to claim 11, wherein the extensions that are formed at both ends of the sync signal optical element in the main scanning direction have different shapes.

14. The optical scanning device according to claim 11, wherein the extensions that are formed at both ends of the sync signal optical element in the main scanning direction are located at a position in the sub-scanning direction that is deviated from a center of the sync signal optical element in the sub-scanning direction.

15. The optical scanning device according to claim 11, wherein the sync signal optical element is a lens made of a resin; and
the extensions are located at the position or positions in the sub-scanning direction that are out of a range, in the sub-scanning direction, of an effective transmission area of the lens.

16. The optical scanning device according to claim 1, further comprising one or more image forming optical elements that are disposed on a laser beam path from the deflector to the outside of the optical scanning device;
wherein in traveling from the deflector to the detecting unit the laser beam does not reach any or part of the one or more image forming optical elements; and
the sync signal optical element has the same optical characteristic as the one or more image forming optical elements do that the laser beam does not reach.

17. An image forming apparatus comprising:
an optical scanning device that comprises:
an emitting unit for emitting a laser beam;
a deflector for detecting the laser beam emitted from the emitting unit to scan in a main scanning direction;
a detecting unit for detecting, to produce a sync signal, a part of the laser beam deflected for scanning by the deflector;
a sync signal optical element disposed on a laser beam path from the deflector to the detecting unit and having converging power at least in an sub-scanning direction that is perpendicular to a scanning plane that is formed by a scan of the laser beam; and
an elastically deformable adjusting unit for adjusting a position of the sync signal optical element in the sub-scanning direction with respect to the detecting unit;
a photosensitive member on which an electrostatic latent image is formed by the laser beam that is supplied from the optical scanning device;
a developing unit for forming a developer image by developing the electrostatic latent image formed on the photosensitive member with a developer;
a transfer unit for transferring, to a recording medium, the developer image that has been formed on the photosensitive member by the developing unit; and
a fixing unit for fixing, on the recording medium, the developer image that has been transferred to the recording medium by the transfer unit.

18. A manufacturing method of an optical scanning device that includes:
an emitting unit for emitting a laser beam;
a deflector for deflecting the laser beam emitted from the emitting unit to scan in a main scanning direction; a detecting unit for detecting, to produce a sync signal, a part of the laser beam deflected for scanning by the deflector; and
a sync signal optical element disposed on a laser beam path from the deflector to the detecting unit and having converging power at least in a sub-scanning direction that is perpendicular to a scanning plane that is formed by a scan of the laser beam, the manufacturing method comprising:
mounting the sync signal optical element on an elastically deformable support unit that supports the sync signal optical element in such a manner that the sync signal optical element is movable in the sub-scanning direction with respect to the detecting unit; and
positioning the sync signal optical element supported by the support unit with respect to the detecting unit.

* * * * *